US010006757B1

(12) United States Patent
Sesko

(10) Patent No.: US 10,006,757 B1
(45) Date of Patent: Jun. 26, 2018

(54) OPTICAL CONFIGURATION FOR MEASUREMENT DEVICE USING EMITTER MATERIAL CONFIGURATION WITH QUADRANT PHOTODETECTORS

(71) Applicant: Mitutoyo Corporation, Kanagawa-ken (JP)

(72) Inventor: David William Sesko, Woodinville, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 0 days. days.

(21) Appl. No.: 15/625,835

(22) Filed: Jun. 16, 2017

(51) Int. Cl.
*G01B 11/00* (2006.01)

(52) U.S. Cl.
CPC ................... *G01B 11/007* (2013.01)

(58) Field of Classification Search
CPC .... G01B 11/002; G01B 11/005; G01B 11/007
See application file for complete search history.

(56) References Cited

U.S. PATENT DOCUMENTS

| | | | |
|---|---|---|---|
| 6,971,183 | B2 | 12/2005 | Brenner et al. |
| 7,652,275 | B2 | 1/2010 | Gladnick |
| 8,438,746 | B2 | 5/2013 | Usui |
| 2013/0222772 | A1 | 8/2013 | Matsubara |
| 2017/0017091 | A1 | 1/2017 | Lee et al. |
| 2017/0176170 | A1 | 6/2017 | Sesko |
| 2017/0176171 | A1 | 6/2017 | Harsila et al. |

OTHER PUBLICATIONS

Olyaee et al., "3-D Measurement by Dual Four-Quadrant Position-Sensitive Detectors in the Stereo Mode," *International Journal of Engineering Research and Applications* 2(3):1157-1161, 2012.
Sesko, "Optical Configuration for Measurement Device Using Emitter Material Configuration," U.S. Appl. No. 15/625,879, filed Jun. 16, 2017, 58 pages.
Bhatti (ed.), *Advances in Theory and Applications of Stereo Vision*, InTech, Rijeka, Croatia, 2011, Chapter 8, Yamaguchi, "Three Dimensional Measurement Using Fisheye Stereo Vision," downloaded from https://www.intechopen.com/books/advances-in-theory-and-applications-of-stereo-vision/three-dimensional-measurement-using-fisheye-stereo-vision, pp. 151-164.

*Primary Examiner* — Gordon J Stock, Jr.
(74) *Attorney, Agent, or Firm* — Seed IP Law Group LLP

(57) ABSTRACT

A scanning probe responsive in 3 axes is provided for use in a coordinate measuring machine. The scanning probe includes a frame, a stylus suspension portion and a stylus position detection portion. The stylus position detection portion includes a light source and a position indicating element that is fixed relative to the stylus coupling portion and that includes at least one emitter portion having an emitter material (e.g., phosphor) that inputs and absorbs light from the light source and responds by outputting excitation light. In various implementations, the excitation light is directed as measurement light along a measurement spot path (e.g., including a telecentric imaging configuration) to form a measurement spot at a spot location on a position sensitive detector (e.g., a quadrant-type photodetector), for which the spot location changes in response to a corresponding change in a position of the position indicating element and the stylus coupling portion.

20 Claims, 9 Drawing Sheets

OPTICAL CONFIGURATION FOR MEASUREMENT DEVICE USING EMITTER MATERIAL CONFIGURATION WITH QUADRANT PHOTODETECTORS

BACKGROUND

Technical Field

This disclosure relates to precision metrology, and more particularly to sensing configurations in probes used with coordinate measuring machines.

Description of the Related Art

Coordinate measurement machines (CMM's) can obtain measurements of inspected workpieces. One exemplary prior art CMM described in U.S. Pat. No. 8,438,746, which is hereby incorporated herein by reference in its entirety, includes a probe for measuring a workpiece, a movement mechanism for moving the probe, and a controller for controlling the movement. A CMM including a surface scanning probe is described in U.S. Pat. No. 7,652,275, which is hereby incorporated herein by reference in its entirety. As disclosed therein, a mechanical contact probe or an optical probe may scan across the workpiece surface.

A CMM employing a mechanical contact probe is also described in U.S. Pat. No. 6,971,183 (the '183 patent), which is hereby incorporated herein by reference in its entirety. The probe disclosed therein includes a stylus having a surface contact portion, an axial motion mechanism and a rotary motion mechanism. The axial motion mechanism includes a moving member that allows the contact portion to move in a central axis direction (also referred to as a Z direction or an axial direction) of the measuring probe. The rotary motion mechanism includes a rotating member that allows the contact portion to move perpendicular to the Z direction. The axial motion mechanism is nested inside the rotary motion mechanism. The contact portion location and/or workpiece surface coordinates are determined based on the displacement of the rotating member and the axial displacement of the axial motion moving member.

Motion mechanisms and/or conventional displacement detector arrangements such as those disclosed in the '183 patent may be relatively expensive and/or susceptible to various "cross coupling" errors (e.g., due to the general configuration and/or mechanism and/or detector imperfections, etc.) Other issues with such configurations may include non-linearities that are inherent in the response of the system (e.g., due to moving optical elements), position errors resulting from a movement of a light source that is utilized, etc. A need exists for an improved sensing configuration in a probe (e.g., wherein the displacement detector configurations may be less susceptible to errors such as those noted above, may be relatively less expensive and/or may have higher levels of accuracy, etc.)

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A scanning probe responsive in 3 axes is provided for use in a measuring machine (e.g., a CMM). The scanning probe includes a frame, a stylus suspension portion and a stylus position detection portion. The stylus suspension portion is attached to the frame and includes a stylus coupling portion that is configured to be rigidly coupled to a stylus, and a stylus motion mechanism that is configured to enable axial motion of the stylus coupling portion along an axial direction, and rotary motion of the stylus coupling portion about a rotation center. The stylus position detection portion includes a first position sensitive detector, a light source configuration and a position indicating element.

The first position sensitive detector is fixed relative to the frame and comprises a first photodetector (e.g., a quadrant-type photodetector) that is configured to provide an output that is responsive to the position of a first measurement spot along first and second sensing axis directions of the first position sensitive detector. The light source configuration is fixed relative to the frame and is configured to radiate source light comprising a first wavelength range along at least one source light path. The position indicating element is fixed relative to the stylus coupling portion and moves with the stylus coupling portion. The position indicating element comprises at least one emitter portion including an emitter material that inputs the light in the first wavelength range from the light source and responds by outputting excitation light generated within the emitter material. In various implementations, the generated excitation light comprises a second wavelength range not included in the first wavelength range.

In various implementations, the at least one emitter portion is configured to input the source light along the at least one source light path regardless of the position of the stylus coupling portion within its motion range. The position indicating element is configured to output a first portion of the generated excitation light as first measurement light along a first measurement spot path (e.g., including a telecentric imaging configuration) to form the first measurement spot at a first spot location on the first position sensitive detector, for which the first spot location changes in response to a corresponding change in a position of the position indicating element and the stylus coupling portion. The first position sensitive detector outputs a first set of position indicating signals that are indicative of the first spot location on the first position sensitive detector.

In various implementations, the scanning probe further comprises a second position sensitive detector which is fixed relative to the frame and which comprises a second photodetector (e.g., a quadrant-type photodetector) configured to provide an output that is responsive to the position of a second measurement spot along at least a first sensing axis direction of the second position sensitive detector. In such a configuration, the position indicating element may further be configured to output a second portion of the generated excitation light as second measurement light along a second measurement spot path (e.g., including a telecentric imaging configuration) to form the second measurement spot at a second spot location on the second position sensitive detector, for which the second spot location changes in response to a corresponding change in a position of the position indicating element and the stylus coupling portion. The second position sensitive detector outputs a second set of position indicating signals that are indicative of the second spot location on the second position sensitive detector. In various implementations, the first set of position indicating signals from the first position sensitive detector in combination with the second set of position indicating signals from the second position sensitive detector are indicative of the position of the position indicating element and the stylus coupling portion relative to the frame. In various implementations, rather than utilizing a second position sensitive detector, multiplexing circuitry may be utilized to multiplex the first and second measurement spots onto the first position sensitive detector and to provide demultiplexing to separate the output signals (e.g., the first and second sets of position indicating signals) from the first position sensitive detector corresponding to the first and second measurement spots.

DETAILED DESCRIPTION

Figure 1:
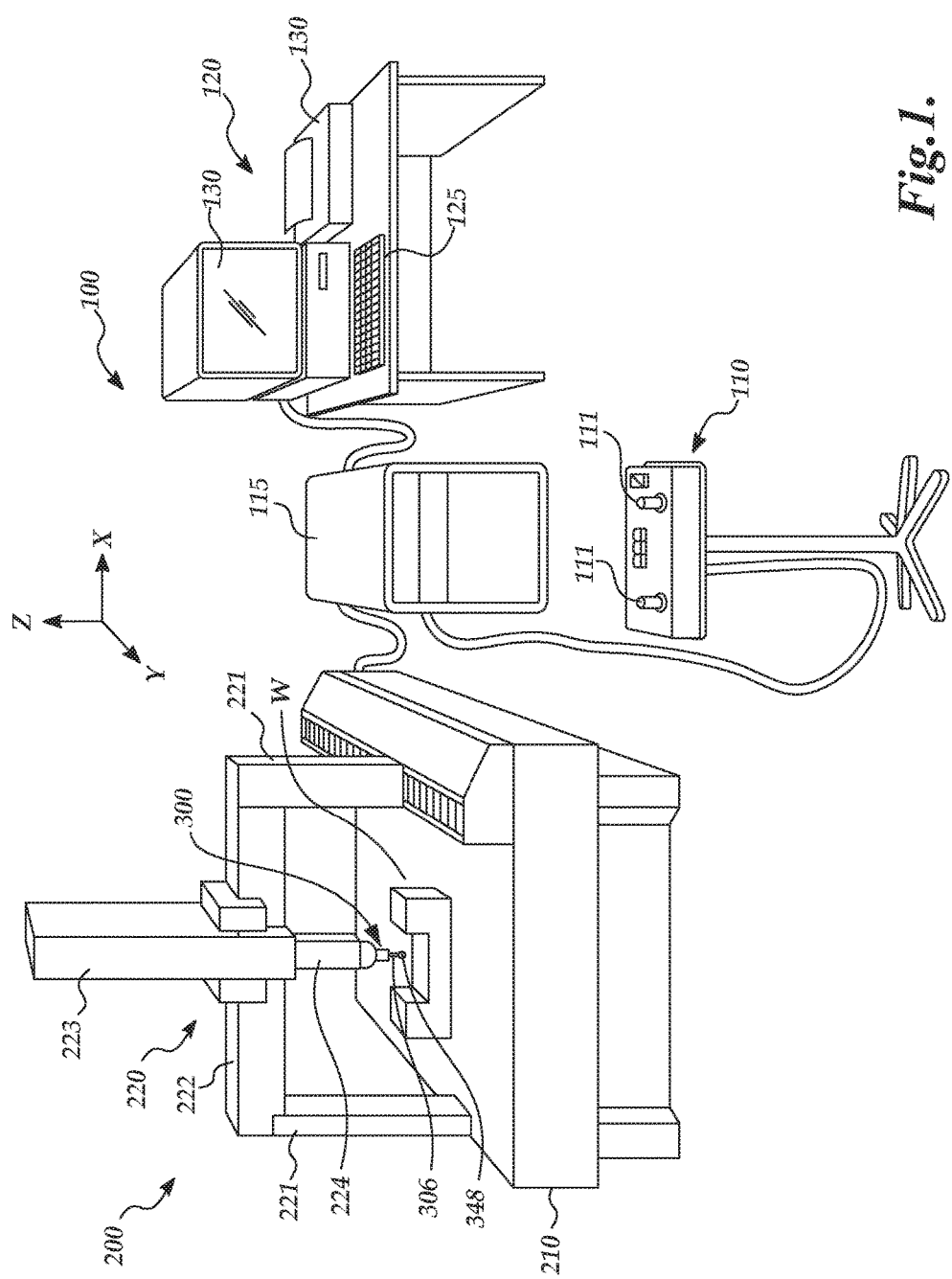
FIG. 1 is a diagram showing various typical components of a measuring system including a CMM utilizing a scanning probe such as that disclosed herein.

FIG. 1 is a diagram showing various typical components of a measuring system 100 including a CMM 200 utilizing a scanning probe 300 such as that disclosed herein. The measuring system 100 includes an operating unit 110, a motion controller 115 that controls movements of the CMM 200, a host computer 120 and the CMM 200. The operating unit 110 is coupled to the motion controller 115 and may include joysticks 111 for manually operating the CMM 200. The host computer 120 is coupled to the motion controller 115 and operates the CMM 200 and processes measurement data for a workpiece W. The host computer 120 includes input means 125 (e.g., a keyboard, etc.) for inputting, for example, measurement conditions, and output means 130 (e.g., a display, printer, etc.) for outputting, for example, measurement results.

The CMM 200 includes a drive mechanism 220 which is located on a surface plate 210, and an attachment portion 224 for attaching the scanning probe 300 to the drive mechanism 220. The drive mechanism 220 includes x-axis, y-axis, and z-axis slide mechanisms 222, 221, and 223, respectively, for moving the scanning probe 300 three-dimensionally. A stylus 306 attached to the end of the scanning probe 300 includes a contact portion 348. As will be described in more detail below, the stylus 306 is attached to a stylus suspension portion of the scanning probe 300, which allows the contact portion 348 to freely change its position in multiple directions when the contact portion 348 moves along a measurement path on the surface of the workpiece W.

Figure 2:
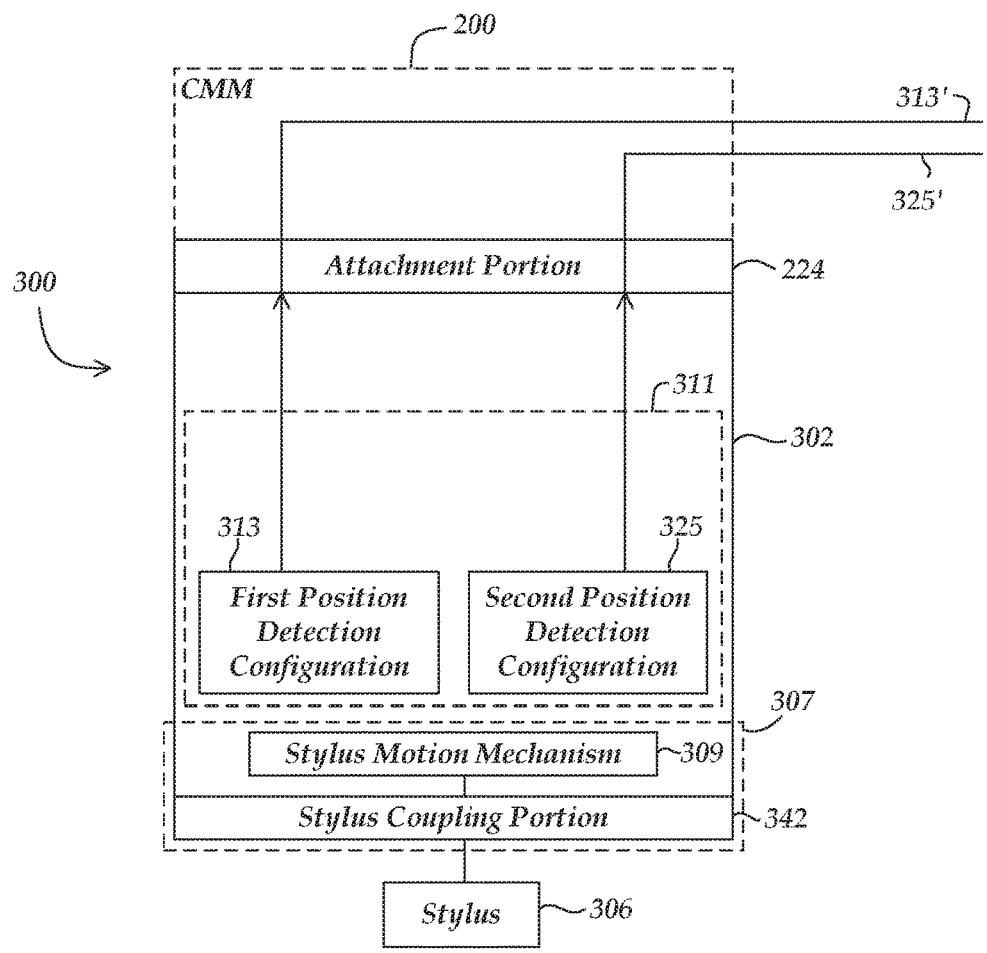
FIG. 2 is a block diagram showing various elements of a scanning probe as coupled to a CMM and providing position signals.

FIG. 2 is a block diagram showing various elements of a scanning probe 300 as coupled to a CMM 200 and providing position signals. The scanning probe 300 includes a probe main body 302 (e.g., comprising a frame) which incorporates a stylus suspension portion 307 and a stylus position detection portion 311. The stylus suspension portion 307 includes a stylus coupling portion 342 and a stylus motion mechanism 309. The stylus coupling portion 342 is rigidly coupled to a stylus 306. The stylus motion mechanism 309 is configured to enable various types of motion of the stylus coupling portion 342 and attached stylus 306. For example, in one implementation the stylus motion mechanism 309 may be configured to enable axial motion of the stylus coupling portion 342 and attached stylus 306 along an axial direction, and to enable rotary motion of the stylus coupling portion 342 and attached stylus 306 about a rotation center.

As shown in FIG. 2, the stylus position detection portion 311 includes a first position detection configuration 313 and a second position detection configuration 325. The first position detection configuration 313 outputs a first set of position indicating signals 313'. In one specific example implementation, the first set of position indicating signals 313' may include at least first and second rotary signals (e.g., X and Y position signals) that are indicative of the rotary position of the stylus coupling portion 342. The second position detection configuration 325 outputs a second set of position indicating signals 325'. In one specific example implementation, the second set of position indicating signals 325' may include axial signals (e.g., Z position signals) that are indicative of the axial position of the stylus coupling portion 342 along the axial direction. In various implementations, one or more receiving portions (e.g., in the CMM 200, motion controller 115, host computer 120, etc.) may receive the first and second sets of position indicating signals and one or more associated processing portions may be utilized to determine a 3D position of the stylus coupling portion 342 and/or of the contact portion of the attached stylus 306 as the contact portion moves along a surface of a workpiece that is being measured.

Figure 3:
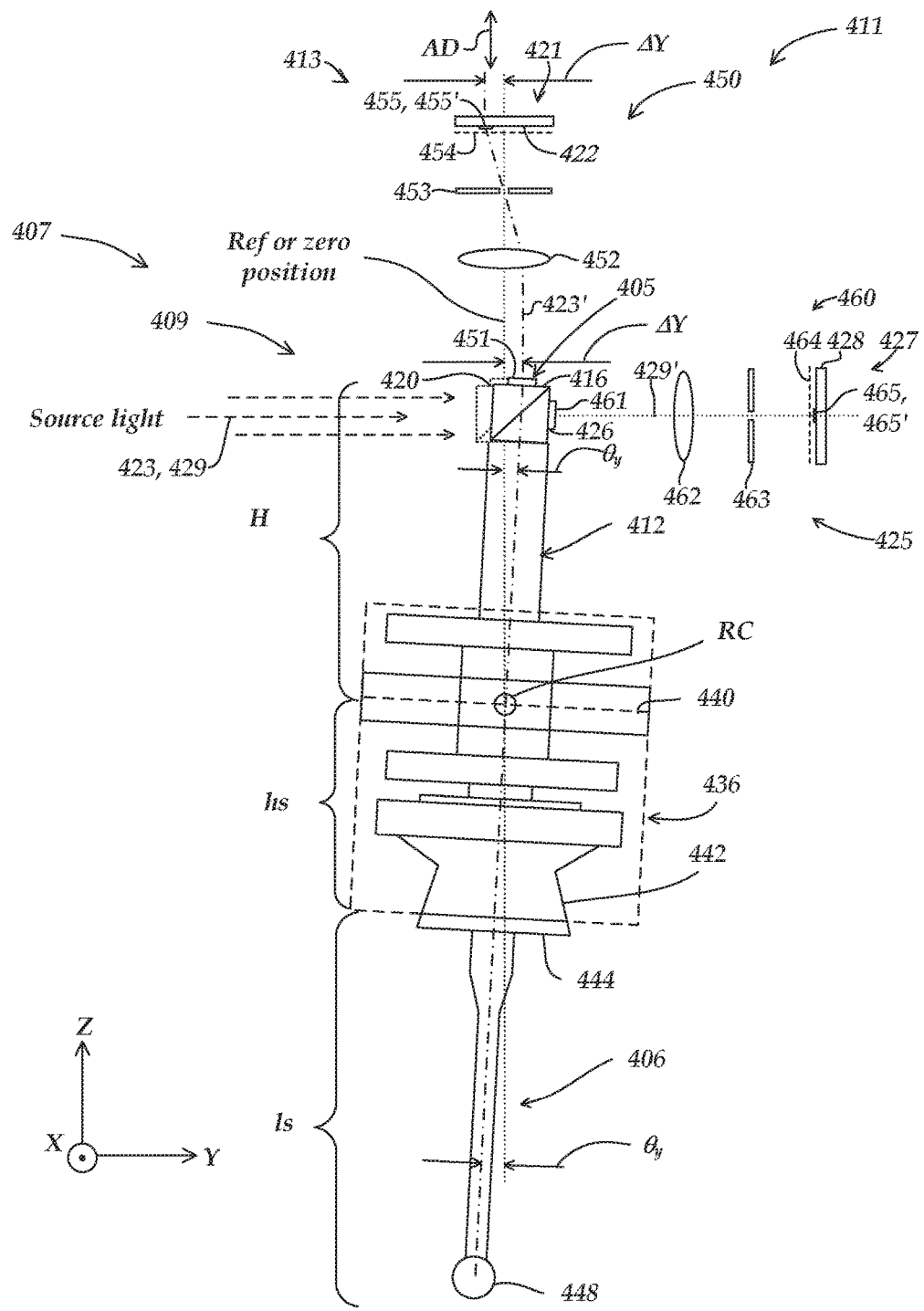
FIG. 3 is a diagram showing portions of a first exemplary implementation of a stylus suspension portion as coupled to a stylus and a first exemplary implementation of a stylus position detection portion including first and second position sensitive detectors for detecting the position of the stylus suspension portion.

FIG. 3 is a diagram showing portions of a first exemplary implementation of a schematically/partially represented stylus suspension portion 407 as coupled to a stylus 406. It will be appreciated that certain numbered components 4XX of FIG. 3 may correspond to and/or have similar operations as similarly numbered counterpart components 3XX of FIG. 2, and may be understood by analogy thereto and as otherwise described below. This numbering scheme to indicate elements having analogous design and/or function is also applied to the following FIGS. 4-9. As shown in FIG. 3, the stylus suspension portion 407 includes a stylus motion mechanism 409 and a stylus coupling portion 442. The stylus coupling portion 442 is configured to be rigidly coupled to a stylus 406 which has a contact portion 448 for contacting a surface S of a workpiece W (not shown).

As will be described in more detail below with respect to FIG. 5, the stylus motion mechanism 409 is configured to enable motion of the stylus coupling portion 442 and attached stylus 406 so that the contact portion 448 can change its position along the shape of the surface S. In one specific example implementation, the stylus motion mechanism 409 is configured to enable axial and rotary motion of the stylus coupling portion 442 and attached stylus 406 so that the contact portion 448 can change its position in three directions along the shape of the surface S. For purposes of illustration, the vertical and horizontal directions on the plane of paper in FIG. 3 are defined as Z and Y directions, respectively, and the perpendicular direction to the plane of the paper is defined as the X direction. The direction of a central axis O (e.g., axial direction AD) of the measuring probe 300 coincides with the Z direction in this illustration.

In FIG. 3, rotary motion portions of the stylus motion mechanism 409 are illustrated, including a rotating member 436 (which is also referenced as a rotating member RP), a flexure element 440, and a moving member 412 disposed within the rotating member 436. As will be described in more detail below with respect to FIG. 5, the flexure element 440 enables rotary motion of the rotating member 436 about a rotation center RC. As will also be described in more detail below, in various implementations a first photodetector 422 and a second photodetector 428 are able to sense the position of the moving member 412. In the example of FIG. 3, the first photodetector 422 is able to sense the rotated position of the moving member 412 in X and Y directions, and the second photodetector 428 is able to sense the axial position of the moving member 412 in the Z direction. Various components of a similar stylus motion mechanism are described in copending and commonly assigned U.S. patent application Ser. No. 14/973,431, entitled "Optical Configuration For Measurement Device", filed on Dec. 17, 2015, which is hereby incorporated herein by reference in its entirety.

As shown in FIG. 3, a first exemplary implementation of a stylus position detection portion 411 includes a position indicating element 405 that is coupled to the moving member 412 and which moves relative to the frame (e.g., wherein the frame is included as part of the probe body, etc.) Various other components of the stylus position detection portion 411 may be fixed relative to the frame unless otherwise indicated. In the example of FIG. 3, the position indicating element 405 includes a beamsplitter 420, a first emitter portion 451 and a second emitter portion 461. The beamsplitter 420 is attached to the end of the moving member 412 and includes first and second position indicating element portions 416 and 426 (e.g., surfaces of the beamsplitter) where the first and second emitter portions 451 and 461 are located, respectively.

The stylus position detection portion 411 further includes a first position detection configuration 413 and a second position detection configuration 425. As will be described in more detail below, the first position detection configuration 413 includes a first measurement spot generating configuration 450 and a first position sensitive detector 421. The second position detection configuration 425 includes a second measurement spot generating configuration 460 and a second position sensitive detector 427. The first position sensitive detector 421 includes the first photodetector 422 and the second position sensitive detector 427 includes the second photodetector 428. As will be described in more detail below with respect to FIG. 4, in various implementations the first and second photodetectors 422 and 428 may each be quadrant-type photodetectors.

The first measurement spot generating configuration 450 includes a light source of a light source configuration (not shown) that provides source light along a first source light path 423, the beamsplitter 420, the first emitter portion 451, a first measurement spot path 423', a first lens 452, a first spatial filter 453 and a first source light filter 454. The second measurement spot generating configuration 460 includes the light source of the light source configuration that provides source light along a second source light path 429, the beamsplitter 420, the second emitter portion 461, a second measurement spot path 429', a second lens 462, a second spatial filter 463 and a second source light filter 464. In the example of FIG. 3, certain portions are common to both the first measurement spot generating configuration 450 and the second measurement spot generating configuration 460 (e.g., the same light source of the light source configuration is utilized in both configurations to provide the source light along the same source light path 423/429 to the same beamsplitter 420). Alternatively, in other configurations separate components may be utilized for these portions of the configurations (e.g., as will be described in more detail below with respect to FIG. 9).

In operation, source light (e.g., from the light source of the light source configuration that is fixed relative to the frame) is provided along a source light path (i.e., corresponding to both the first source light path 423 and the second source light path 429). The beamsplitter 420 receives and splits the source light into a first portion of the divided source light which is directed toward the first emitter portion 451 and a second portion of the divided source light which is directed toward the second emitter portion 461. In an alternative implementation, multiple light sources may be utilized for which a beamsplitter may not be required for splitting the source light into multiple paths, as will be described in more detail below with respect to FIG. 9.

In various implementations, the first and second emitter portions 451 and 461 of the position indicating element 405 (i.e., which is fixed relative to the stylus coupling portion 442 and moves with the stylus coupling portion 442) include emitter material (e.g., a phosphor filled resin, or the like that is fixed to the surfaces of the beamsplitter 420). In various implementations, the emitter material as generally described herein may comprise one or more conventional phosphor materials such as YAG-Ce+-based phosphors, or photoluminescent semiconductor nanoparticles or nanocrystals, or Q-particle phosphors (commonly called quantum dots or semiconductor quantum dots), or zinc oxide nanorods, or the like. The emitter material inputs the source light (e.g., in a first wavelength range) from the light source and responds by outputting excitation light generated within the emitter material (e.g., the generated excitation light comprising a second wavelength range not included in the first wavelength range). As will be described in more detail below, the first and second emitter portions 451 and 461 of the position indicating element 405 output first and second portions of the generated excitation light, respectively.

In various implementations, the first emitter portion 451 of the position indicating element 405 is configured to input the source light along the first source light path 423 regardless of the position of the stylus coupling portion 442 within its motion range. The first emitter portion 451 is further configured to emit the first portion of the generated excitation light as first measurement light along the first measurement spot path 423' to form a first measurement spot 455 at a first spot location 455' on the first position sensitive detector 421. In various implementations, the first spot location 455' changes in response to a corresponding change in a position of the position indicating element 405 and the stylus coupling portion 442.

More specifically, the first measurement light is focused by the first lens 452 and passes through the first spatial filter 453 and the first source light filter 454 to form the measurement spot 455 at the first spot location 455' on the first position sensitive detector 421. In various implementations, the first lens 452 and the first spatial filter 453 are part of an optical configuration that the first measurement spot path 423' passes through, and are positioned in a telecentric imaging configuration according to known principles. The telecentric imaging configuration operates to image the generated excitation light from the first emitter portion 451 as the first measurement spot 455 at the first spot location 455' on the first position sensitive detector 421.

In various implementations, the first measurement spot 455 moves along the first and second sensing axis directions of the first position sensitive detector 421 corresponding to a position (e.g., a rotary position, etc.) of the stylus coupling portion 442 and the associated position of the first emitter portion 451 (e.g., transverse to the axial direction wherein the axial direction approximately corresponds to the Z axis direction). In this configuration, the first and second sensing axis directions of the first position sensitive detector 421 are approximately perpendicular to one another in a plane oriented transverse to the axial direction AD. The first position sensitive detector 421 outputs a first set of position indicating signals (e.g., first and second rotary signals, etc.) that are indicative of the first spot location 455' on the first position sensitive detector 421. In various implementations, the first set of position indicating signals may correspondingly be indicative of a position of the stylus coupling portion 442 (e.g., first and second rotary signals may be indicative of a rotary position of the stylus coupling portion 442, etc.)

In various implementations (e.g., due at least in part to the telecentric arrangement of the first lens 452 and the first spatial filter 453), a movement of the first emitter portion 451 may correspond to a specified amount of movement of the first measurement spot 455 on the first position sensitive detector 421. In one specific implementation, this may correspond to a 1:1 ratio, such that a movement of AY of the first emitter portion 451 may correspond to a same amount of movement AY of the first measurement spot 455 on the first position sensitive detector 421. In such an implementation, the movement or displacement $\Delta Y_{PSD}$ along the Y direction away from null (e.g., a reference or zero position, etc.) for the first measurement spot 455 on the first photodetector 422 of the first position sensitive detector 421 may be approximated as:

$$\Delta Y_{PSD} = H\theta_Y \quad \text{(Eq. 1)}$$

where H is the distance from the rotation center RC to the first emitter portion 451, and $\theta_Y$ is the rotary motion tilt of the rotating member 436 in a plane parallel to the Y direction (i.e., that is, rotation about an axis parallel to the X axis at the rotation center RC). The Y direction movement or displacement $Y_{STYLUS}$ away from null (e.g., a reference or zero position, etc.) of the contact portion 448 of the stylus 406 in relation to the rotary motion tilt component $\theta_Y$ may be approximated as:

$$Y_{STYLUS} = \theta_Y*(h_S + I_S) \quad \text{(Eq. 2)}$$

where $h_S$ is the distance from the end of the stylus coupling portion 442 to the rotation center RC and $I_S$ is the length of the stylus 406. Combining Equations 1 and 2, the ratio of the Y direction spot displacement on the photodetector 422 in relation to the Y direction displacement at the contact portion 448 may be approximated as:

$$\Delta Y_{PSD}/\Delta Y_{STYLUS} = H/(h_S + I_S) \quad \text{(Eq. 3)}$$

It will be appreciated that the X coordinate motion components are analogous to the above expressions, and will not be explained in further detail herein. The stylus length $I_S$ for various styli may be utilized in the equations (e.g., with respect to the trigonometry of the system) for determining the X-Y position of the contact portion 448 based on the X-Y detected spot position.

In various implementations, the second emitter portion 461 of the position indicating element 405 (i.e., which is fixed relative to the stylus coupling portion 442 and moves with the stylus coupling portion 442) is configured to input the source light along the second source light path 429 regardless of the position of the stylus coupling portion 442 within its motion range. The second emitter portion 461 is further configured to emit the second portion of the generated excitation light as second measurement light along the second measurement spot path 429' to form a second measurement spot 465 at a second spot location 465' on the second position sensitive detector 427. In various implementations, the second spot location 465' changes in response to a corresponding change in a position of the position indicating element 405 and the stylus coupling portion 442.

More specifically, the second measurement light is focused by the second lens 462 and passes through the second spatial filter 463 and the second source light filter 464 to form the second measurement spot 465 at the second spot location 465' on the second position sensitive detector 427. In various implementations, the second lens 462 and the second spatial filter 463 are part of an optical configuration that the second measurement spot path 429' passes through, and are positioned in a telecentric imaging configuration according to known principles. The telecentric imaging configuration operates to image the generated excitation light from the second emitter portion 461 as the second measurement spot 465 at the second spot location 465' on the second position sensitive detector 427. In various implementations, the second measurement spot 465 moves along a sensing axis direction of the second position sensitive detector 427 corresponding to a position (e.g., an axial position approximately corresponding to the Z-axis direction) of the stylus coupling portion 442 and the associated position of the second emitter portion 461. In this configuration, the first sensing axis direction of the second position sensitive detector 427 is approximately parallel to the axial direction. The second position sensitive detector 427 outputs a second set of position indicating signals (e.g., axial signals) that are indicative of the second spot location 465' on the second position sensitive detector 427. In various implementations, the second set of position indicating signals may be indicative of a position of the stylus coupling portion 442 (e.g., the axial signals may be indicative of the axial position of the stylus coupling portion 442, etc.)

In various implementations (e.g., due at least in part to the telecentric arrangement of the second lens 462 and the second spatial filter 463), a movement of the second emitter portion 461 may correspond to a specified amount of movement of the second measurement spot 465 on the second position sensitive detector 427. In one specific implementation, this may correspond to a 1:1 ratio, such that a movement of AZ of the second emitter portion 461 may correspond to a same amount of movement AZ of the second measurement spot 465 on the second position sensitive detector 427. In such an implementation, the movement or displacement $\Delta Z_{PSD}$ along the Z direction away from null (e.g., a reference or zero position, etc.) for the second measurement spot 465 on the second photodetector 428 of the second position sensitive detector 427 in relation to the Z direction displacement $\Delta Z_{STYLUS}$ at a stylus contact portion (e.g., the contact portion 448) may be approximated as:

$$\Delta Z_{PSD}/\Delta Z_{STYLUS} \approx 1 \quad \text{(Eq. 4)}$$

In various implementations, mechanical complexity is avoided if the second emitter portion 461 moves in at least one direction that is transverse to the axial direction, for example as illustrated in FIG. 3, both the second emitter portion 461 and the first emitter portion 451 move in 3 directions. However, according to the principles disclosed herein, motion of the second emitter portion 461 approximately transverse to the axial direction (i.e., approximately along the Y axis) does not substantially alter the signal corresponding to the effective position of that spot or line on the second photodetector 428. In the example configuration of FIG. 3, the resulting Z position signal is substantially insensitive to such Y axis motion. In addition, an expected range of motion of the second emitter portion 461 approximately along the X axis direction as produced by small $\theta_x$ rotations of the stylus may alter the effective position of a spot (not a line) on the second photodetector 428 along the "unsensed" X axis direction without substantially altering its Z position, making the Z position signal substantially insensitive to such X axis motion. However, it will be appreciated that the motion arc of the second emitter portion 461 produced by a large $\theta_x$ rotation of the stylus may produce an arc motion of the second measurement spot 465 on the second photodetector 428 that includes a small Z position change component, in addition to an undesirable and/or unsensed X axis position change component of the second measurement spot 465. Calibration or compensation may be used to reduce or eliminate related residual Z error effects in signal processing. In general, known types of calibration to reduce any cross coupling errors and/or iterative/interdependent position coordinate determination methods may be used to further improve the accuracy of measured position or displacement values (e.g., X, Y and Z values, $\theta x$, $\theta y$ and Z values, etc.), if desired.

In various implementations, as part of the corresponding telecentric imaging configurations, the spatial filters 453 and 463 (e.g., including respective central apertures) spatially filter the measurement light from the respective lenses 452 and 462 and thus image the corresponding measurement spots 455 and 465 onto the respective photodetectors 422 and 428 with better accuracy and less sensitivity to focus. The lower sensitivity to focus may be desirable in certain configurations because the moving member 412 moves the first and second emitter portions 451 and 461 to different focal distances, wherein it may be preferable for the measurement spots 455 and 465 to not be significantly affected by the different focal distances. More specifically, the primary position determining techniques may relate to the lateral movements of the measurement spots 455 and 465 on the respective photodetectors 422 and 428, for which it may be undesirable for the measurement spots 455 and 465 to change significantly due to focus changes. In this regard, it will be appreciated that the respective apertures of the spatial filters 453 and 463 effectively "select" the approximately collimated rays which correspond to the physical location and extent of the first and second emitter portions 451 and 461, which is what the system is designed to detect.

In various implementations, the source light filters 454 and 464 are optical filters that are configured to block/prevent stray source light (i.e., which in various implementations may be a relatively strong light) from reaching the photodetectors 422 and 428. The source light filters 454 and 464 are also configured to allow the emitted light from the first and second emitter portions 451 and 461 (i.e., which in various implementations may be a relatively weak light) to reach the respective photodetectors 422 and 428. In various implementations, the source light filters 454 and 464 may be configured as high pass filters, band pass filters, or any other type of filtering profile that passes the desired emitted wavelength and blocks other wavelengths. In various implementations, the selection of the type of filter to utilize may depend on the relationship between the source light spectrum (e.g., comprising a first wavelength range) and the emitted spectrum (e.g., comprising a second wavelength range). In various implementations, the emitter material of the emitter portions 451 and 461 may be selected to have a relatively limited emitted spectrum (e.g., to allow for more effective filtering), and may further be selected to have an emitted spectrum that matches a sensitivity spectrum of the photodetectors 422 and 428.

Figure 4:
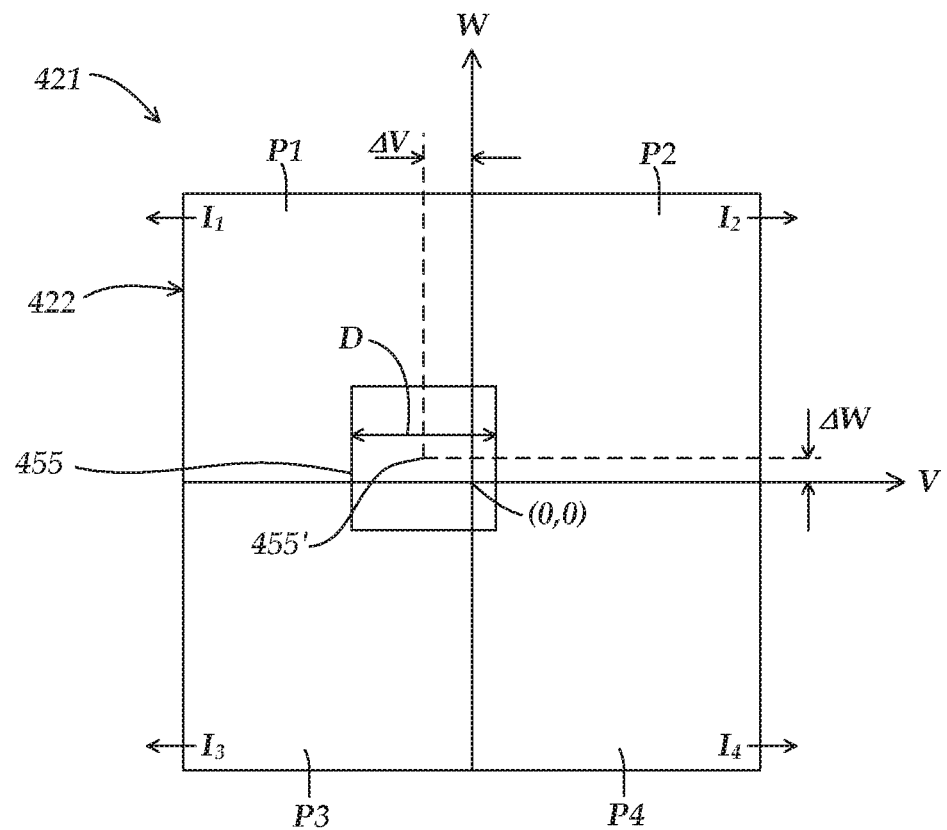
FIG. 4 is a diagram showing an exemplary implementation of the first position sensitive detector of FIG. 3.

FIG. 4 is a diagram showing an exemplary implementation of the position sensitive detector 421 including the photodetector 422 of FIG. 3. In various implementations, the photodetector 422 (as well as the other photodetectors included in the various implementations disclosed herein, such as photodetectors 428, 522, 528, 722, 728, 822, 828, 922 and 928) may be a quadrant-type photodetector (e.g., a quadrature photodiode). As described above with respect to FIG. 3, the first emitter portion 451 (e.g., a square shaped emitter portion in this example) is configured to output the first portion of the generated excitation light as first measurement light along the first measurement spot path to form the first measurement spot 455 at the first spot location 455' on the first position sensitive detector 421. In this configuration, the first emitter portion 451 is configured to appear in an approximately square shape when viewed along the first measurement spot path. In various implementations, the first spot location 455' changes in response to a corresponding change in a position of the position indicating element 405 and the stylus coupling portion 442.

In this example, the square shaped emitter portion 451 produces a uniform square intensity distribution as formed by the phosphor (i.e., the emitter material). The light from the phosphor is imaged with the optical configuration including the telecentric optics (e.g., lens 452 and spatial filter 453 of FIG. 3) onto the quadrant-type photodetector 422. The telecentric optics preserve the magnification over the telecentric depth range. In various implementations, the square shape of the emitter portion 451 and radiant uniformity of the phosphor are configured to create a linear response with respect to the movement of the measurement spot 455 on the quadrant-type photodetector 422. As will be described in more detail below, the emitted light is imaged onto the quadrant-type photodetector 422 and the position of the emitter portion 451 is determined by the differential voltage of the quadrant-type photodetector 422.

In various implementations, the two-dimensional quadrant-type photodetector 422 is formed by four separate photodiodes P1-P4 meeting at a common corner (e.g., at an origin location 0,0). In one implementation, a differential detection scheme is utilized wherein part of the measurement spot 455 (e.g., a large area spot) is imaged onto each quadrant of the quadrant-type photodetector 422. The fraction of the spot that overlaps each quadrant photodiode P1-P4 determines the current I1-I4 at each electrode. The size of the imaged spot determines the detection range and resolution. In accordance with such a configuration, a square measurement spot 455 achieves a linear response from the quadrant-type photodetector 422 with respect to various types of movements. In various alternative implementations, other shapes of measurement spots (e.g., rectangular, circular, etc.) may alternatively be utilized, although different equations and/or filtering may correspondingly be implemented to achieve desired linear and/or other types of responses from the quadrant-type photodetector 422 for corresponding movements.

As described above with respect to FIG. 3, the first spot location 455' changes in response to a corresponding change in a position of the position indicating element 405 and the stylus coupling portion 442. The position of the first spot location 455' may be referenced from null (e.g., a reference or zero position (0,0), etc.) along a first sensing axis direction V and a second sensing axis direction W of the quadrant-type photodetector 422. More specifically, in various implementations the position of the first spot location 455' (i.e., as referenced from the center of the square shaped measurement spot 455) may be determined according to the following equations:

$$\Delta v = \frac{D}{2} \frac{(I_1 + I_3) - (I_2 + I_4)}{(I_1 + I_2 + I_3 + I_4)}$$ (Eq. 5)

$$\Delta w = \frac{D}{2} \frac{(I_1 + I_2) - (I_3 + I_4)}{(I_1 + I_2 + I_3 + I_4)}$$ (Eq. 6)

where ΔV and ΔW are the respective delta positions along the first and second sensing axis directions V and W of the quadrant-type photodetector 422, D is the square dimension (i.e., length or width) of the square shaped measurement spot 455, and I1-I4 are the currents at each electrode of each quadrant photodiode P1-P4, respectively, of the quadrant-type photodetector 422.

As will be described in more detail below, in various implementations, two quadrant-type photodetectors may be utilized for the two position sensitive detectors 421 and 427, and by combining the signals of the two position sensitive detectors the position of the moving member 412 and/or coupled components (e.g., the contact portion 448, etc.) may be determined. As noted above, the position of the moving member 412 may in some instances be referenced according to certain types of coordinates (e.g., θx, θy, Z), wherein the outputs of the two position sensitive detectors may be utilized to determine the corresponding coordinates. In certain implementations, various trigonometric or other principles may be utilized for equations for converting the outputs of the two position sensitive detectors to the corresponding position of the moving member 412 and/or coupled components (e.g., trigonometry may be utilized with respect to the configurations of FIGS. 7 and 8, as will be described in more detail below).

In various implementations, configurations utilizing quadrant-type photodetectors may have certain advantages over configurations utilizing other types of sensors. For example, in certain implementations a quadrant-type photodetector may be approximately 30 times more sensitive than a similarly sized lateral effect position sensitive detector. In various implementations utilizing quadrant-type photodetectors, it is desirable to structure the configuration to ensure that the intensity distribution across the measurement spot 455 is relatively uniform and that the shape with desired characteristics (e.g., a square) is formed in order to achieve a desired linearity of the output of the quadrant-type photodetector 422. As noted above, utilization of a telecentric imaging configuration (e.g., including the lens 452 and the spatial filter 453) helps ensure that the square shaped emitter portion 451 is clearly imaged as a square shape as the measurement spot 455 at the position sensitive detector 421, which helps achieve the desired linear response.

In various alternative implementations, a lateral effect position sensitive detector may be utilized for one or more of the position sensitive detectors (e.g., position sensitive detectors 421, 427, etc.) In such configurations, the lateral effect position sensitive detector may have a relatively smaller spot size (e.g., having a 200 um-400 um measurement spot diameter) imaged onto it. Electrodes at the four corners of the lateral effect position sensitive detector each detect the whole spot. The lateral effect position sensitive detector may have a resistive layer in its structure so that the current sensed at the four corners depends on the position of the spot relative to each electrode. In various implementations, a configuration utilizing a lateral effect position sensitive detector may achieve good linearity that is a result of the detector design, and the position linearity may be minimally affected by the intensity distribution of the small light spot, but as noted above may also have a lower sensitivity than a configuration utilizing a similarly sized quadrant-type position sensitive detector. Techniques utilizing position sensitive detectors described in more detail in a patent application entitled "Optical Configuration For Measurement Device Using Emitter Material Configuration" (U.S. application Ser. No. 15/625,879 filed on Jun. 16, 2017), which is filed concurrently herewith and is hereby incorporated herein by reference in its entirety.

Figures 5, 6:
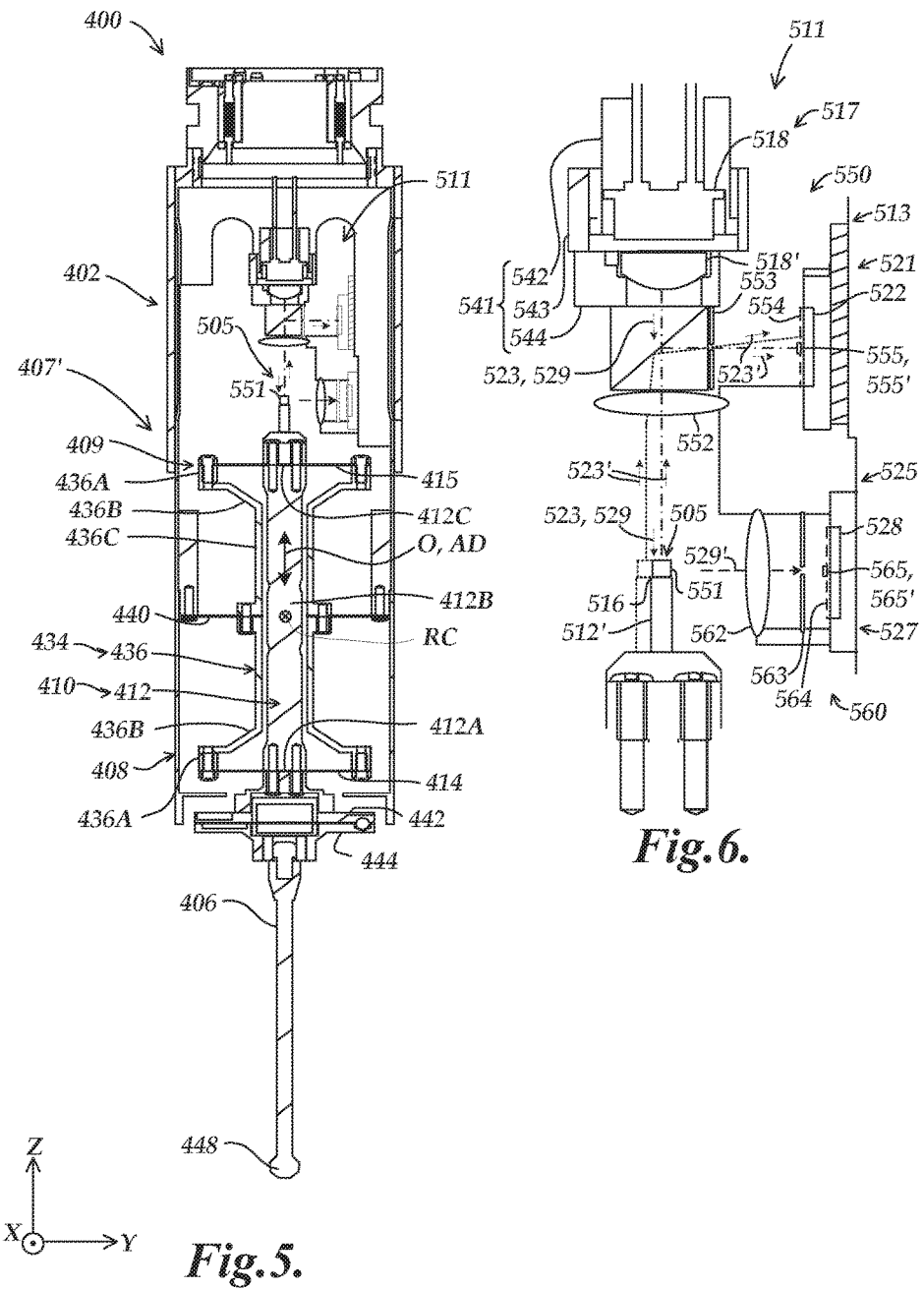
FIG. 5 is a diagram showing a cross section of one implementation of the stylus suspension portion of FIG. 3 as included within a main body frame of a scanning probe.
FIG. 6 is a diagram showing a second exemplary implementation of a stylus position detection portion as included in the scanning probe of FIG. 5.

FIG. 5 is a partially schematic diagram showing one implementation of a cross section of a stylus suspension portion 407' usable as the stylus suspension portion 407 represented in FIG. 3, as included within a main body frame 408 of a probe main body 402 of a scanning probe 400. As shown in FIG. 5, the stylus suspension portion 407' includes a stylus motion mechanism 409 and a stylus coupling portion 442 which is coupled to a stylus 406. The stylus motion mechanism 409 may include a moving member 412, a rotating member 436, a flexure element 440 coupled to the main body frame 408 for supporting and enabling rotary motion of the rotating member 436, and flexure elements 414 and 415 (i.e., referenced as first flexure elements) supporting the moving member 412 and coupling it to the rotating member 436 for enabling axial motion of the moving member 412. The scanning probe 400 includes a stylus position detection portion 511 having components and operation described in more detail below with reference to FIG. 5, for determining the position and/or motion of the stylus motion mechanism 409 and/or the contact portion 448 of the stylus 406.

The flexure element 440 (i.e., referenced as a second flexure element) may be disposed between the respective planes of a pair of flexure elements 414 and 415 (i.e., referenced as first flexure elements) in the axial direction θ. The rotating member 436 may have a shape symmetric about the second flexure element 440 and may integrally include: two ring portions 436A; two connecting portions 436B; and a cylindrical portion 436C. Peripheral portions of the first flexure elements 414 and 415 are fixed to the ring portions 436A. The connecting portions 436B extend inside of the ring portions 436A so as to connect to the cylindrical portion 436C, which has a hollow center. The first flexure elements 414 and 415 may be disposed at a symmetric distance with respect to the second flexure element 440, although such an implementation is intended to be exemplary only and not limiting.

An axial motion mechanism 410 including the moving member 412 is supported inside of the rotating member 436, and the rotating member 436 and the axial motion mechanism 410 together constitute a motion module that is part of the stylus motion mechanism 409. The axial motion mechanism 410 allows the contact portion 448 to move in the axial direction θ. A rotary motion mechanism 434 including the rotating member 436 allows the contact portion 448 of the stylus 406 to move transverse (e.g., approximately perpendicular) to the axial direction θ by means of rotary motion about the rotation center RC.

The moving member 412 integrally includes: a lower portion 412A; a rod portion 412B; and an upper portion 412C. As described in more detail below with respect to the stylus position detection portion 511 shown in FIG. 6, a position indicating element 505 is attached to the upper portion 412C. The rod portion 412B is disposed between the pair of first flexure elements 414 and 415 and is housed in the rotating member 436.

The lower portion 412A is formed below the rod portion 412B and a stylus coupling portion 442 (e.g., a flange member) is attached to the lower portion 412A. A flange part 444 is provided for attachment of the stylus 406. The flange part 444 and the stylus coupling portion 442 together may constitute a detachable coupling mechanism (e.g., a known type of kinematic joint or coupling) which allows attachment and detachment between various styli 406 and the stylus coupling portion 442 with repeatable positioning (e.g., in case of a collision knocking off a stylus, or when intentionally changing styli, etc.)

FIG. 6 is a diagram showing a second exemplary implementation of a stylus position detection portion 511 as included in the scanning probe 400 of FIG. 5. Certain portions of the stylus position detection portion 511 of FIG. 6 are coupled to the main body frame 408 of the scanning probe 400 of FIG. 5. In the example of FIG. 6, the stylus position detection portion 511 includes the position indicating element 505 which includes an extending portion 512', a position indicating element portion 516 and an emitter portion 551. The position indicating element portion 516 is a surface on the end of the extending portion 512' where the emitter portion 551 is located. As will be described in more detail below, the position indicating element 505 is coupled to the moving member 412 and its attached stylus coupling portion 442. Otherwise, various illustrated elements may be fixed directly or indirectly relative to the main body frame 408. In various implementations, the first set of position indicating signals from the first photodetector 522 in combination with the second set of position indicating signals from the second photodetector 528 enable determination of the position of the position indicating element 505, which correspondingly indicates an absolute 3D position of the stylus coupling portion 442 (and attached stylus 406 and contact portion 448) relative to the main body frame 408. More specifically, as described above with respect to FIG. 2, in various implementations a processing portion (e.g., of a CMM 200, motion controller 115, host computer 120, etc.) may be configured to process the first set of position indicating signals from the first photodetector 522 and the second set of position indicating signals from the second photodetector 528 to determine a 3D position of the contact portion 448 of the stylus 406.

As illustrated in FIG. 6, a light source configuration 517 includes a light source 518 (e.g., an LED light source), and may be configured in some implementations to provide a collimated or nearly collimated light beam (e.g., using a collimating lens 518'). Alignment of the light source 518 may affect the overall performance of the system. In order to allow a proper alignment of the light source 518 and/or collimation lens 518', an alignment assembly such as assembly 541 comprising a Z position tube 542, an X-Y tube 543, and holder/baffle 544, may be used in some implementations.

In general, the stylus position detection portion 511 includes certain components that are similar to those of the stylus position detection portion 411 of FIG. 3, and will be understood to operate similarly except as otherwise described below. As will be described in more detail below, certain differences from the implementation of FIG. 3 include that in FIG. 6 a single emitter portion 551 is arranged approximately along the axial direction AD relative to the rotation center RC, and receives the source light and emits both first and second portions of the generated excitation light which travels as first and second measurement light, respectively. As illustrated in FIG. 6, the stylus position detection portion 511 further includes a first position detection configuration 513 and a second position detection configuration 525.

The first position detection configuration 513 includes a first measurement spot generating configuration 550 and a first position sensitive detector 521. The second position detection configuration 525 includes a second measurement spot generating configuration 560 and a second position sensitive detector 527. As illustrated, the second position sensitive detector 527 includes a second photodetector 528 having a surface plane which may be approximately parallel to the surface plane of a first photodetector 522 of the first position sensitive detector 521, which is another difference from the configuration of FIG. 3 and which in certain implementations may provide certain advantages with respect to the location and organization of the electronic components in the scanning probe 400. As described above with respect to FIG. 4, in various implementations the first and second photodetectors 522 and 528 may each be quadrant-type photodetectors.

The first measurement spot generating configuration 550 includes a light source 518 with a collimating lens 518' that provides source light along a first source light path 523, the emitter portion 551, a first measurement spot path 523', a first lens 552, a first spatial filter 553 and a first source light filter 554. The second measurement spot generating configuration 560 also includes the light source 518 with the collimating lens 518' that provides source light along a second source light path 529, the emitter portion 551, a second measurement spot path 529', a second lens 562, a second spatial filter 563 and a second source light filter 564.

In operation, source light (e.g., comprising a first wavelength range) is radiated from the light source 518 and is provided along a source light path (i.e., corresponding to both the first source light path 523 and the second source light path 529). The source light reaches the emitter portion 551, and the corresponding emitter material inputs the source light and responds by outputting excitation light generated within the emitter material (e.g., the generated excitation light comprising a second wavelength range not included in the first wavelength range). A first portion of the generated excitation light travels as first measurement light along the first measurement spot path 523' to form a first measurement spot 555 at a first spot location 555' on the first position sensitive detector 521. A second portion of the generated excitation light travels as second measurement light along the second measurement spot path 529' to form a second measurement spot 565 at a second spot location 565' on the second position sensitive detector 527.

More specifically, the first measurement light is focused by the first lens 552 and is directed by a beamsplitter 520 to pass through the first spatial filter 553 and the first source light filter 554 to form the first measurement spot 555 at the first spot location 555' on the first position sensitive detector 521. The first position sensitive detector 521 outputs a first set of position indicating signals that are indicative of the first spot location 555' on the first position sensitive detector 521. In the example of FIG. 6, in one implementation the first set of position indicating signals may correspond to first and second rotary signals that vary in response to the position of the first measurement spot 555, and the at least first and second rotary signals may be indicative of the rotary position of the stylus coupling portion 442. In this configuration, the first and second sensing axis directions of the first position sensitive detector 521 are approximately perpendicular to one another in a plane oriented parallel to the axial direction AD.

The second measurement light is focused by the second lens 562 and passes through the second spatial filter 563 and the second source light filter 564 to form the second measurement spot 565 at the second spot location 565' on the second position sensitive detector 527. The second position sensitive detector 527 outputs a second set of position indicating signals that are indicative of the second spot location 565' on the second position sensitive detector 527. In the example of FIG. 6, in one implementation the second set of position indicating signals may correspond to a varying axial signal that changes in response to the position of the second measurement spot 565, and which is indicative of the axial position of the stylus coupling portion 442. In this configuration, the first sensing axis direction of the second position sensitive detector 527 is approximately parallel to the axial direction.

In various implementations, the emitter portion 551 may be of a particular shape and/or size. For example, in one specific implementation, the emitter portion may be formed as a cube or other element with square-shaped sides so as to produce square measurement spots 555 and 565 on the position sensitive detectors 521 and 527, so as to achieve a desired linear response for the movement on the spot locations 555' and 565' on the quadrant-type photodetectors 522 and 528, respectively. The light source 518 for illuminating the emitter portion may also be specified as a particular type, such as a pump laser. In such a configuration, in various implementations the pump laser may be operated in a continuous wave mode if light levels are low enough, or may be operated in a pulsed mode at higher intensity to avoid quenching the emitter material (e.g., phosphor, etc.)

Figure 7:
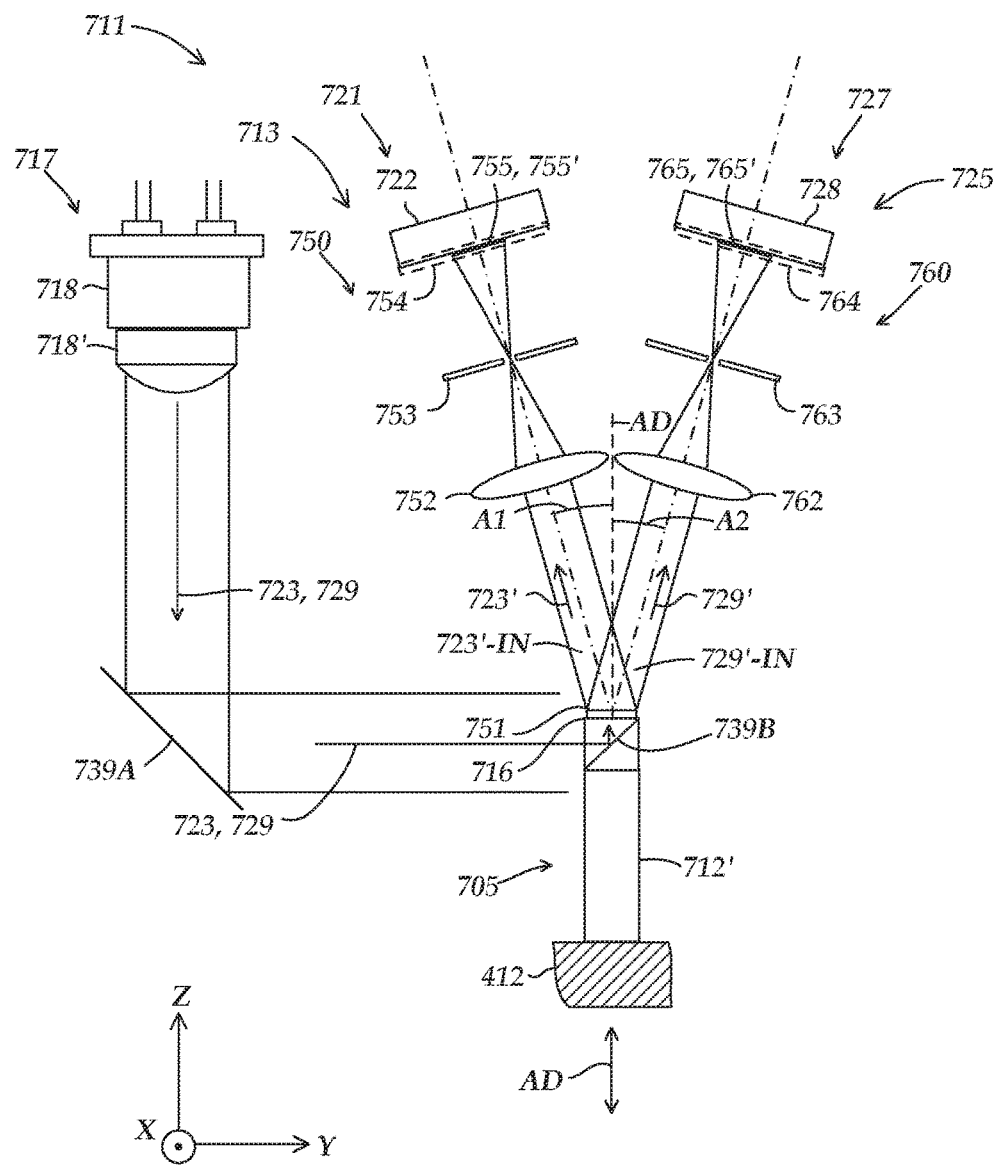
FIG. 7 is a partially schematic diagram showing a third exemplary implementation of a stylus position detection portion.

FIG. 7 is a partially schematic diagram showing a third exemplary implementation of a stylus position detection portion 711. In the example of FIG. 7, the stylus position detection portion 711 includes a position indicating element 705 which includes an extending portion 712', a reflecting element 739B (e.g., a mirror), a position indicating element portion 716 and an emitter portion 751. The position indicating element portion 716 is a surface on which the emitter portion 751 is located. In various implementations, the extending portion 712' is structured to support and position the reflecting element 739B and the emitter portion 751 to perform their respective functions, as will be described in more detail below. For example, in one implementation the extending portion 712' may include a transparent glass block assembly in which the reflecting element 739B is located and on a top surface of which the emitter portion 751 is located. As another example, in an alternative implementation the extending portion 712' may include a frame for supporting the reflecting element 739B and the emitter portion 751, with open air sections in between within the frame. The extending portion 712' of the position indicating element 705 is attached to the moving member 412.

Certain components of the stylus position detection portion 711 are similar to those of the stylus position detection portion 511 of FIG. 6, and will be understood to operate similarly except as otherwise described below. Certain differences from the implementation of FIG. 6 include that in the implementation of FIG. 7 an input portion 723'-IN of the first measurement spot path 723' that inputs the first portion of the generated excitation light forms an angle A1 (e.g., of at least 15 degrees) relative to the axial direction AD. In addition, an input portion 729'-IN of the second measurement spot path 729' that inputs the second portion of the generated excitation light forms an angle A2 (e.g., of at least 15 degrees) relative to the axial direction AD, and forms an angle A1+A2 (e.g., of at least 30 degrees) relative to the input portion 723'-IN of the first measurement spot path 723'. Furthermore, the first and second sensing axis directions of the first position sensitive detector 721 are approximately perpendicular to one another in a plane oriented perpendicular to a direction of the first measurement spot path 723' where it intersects with the first position sensitive detector 721. The first photodetector 722 is configured to provide an output that is responsive to the position (i.e., spot location 755') of the first measurement spot 755 along first and second sensing axis directions of the first position sensitive detector 721. In addition, the first and second sensing axis directions of the second position sensitive detector 727 are approximately perpendicular to one another in a plane oriented perpendicular to a direction of the second measurement spot path 729' where it intersects with the second position sensitive detector 727. The second photodetector 728 is configured to provide an output that is responsive to the position (i.e., the spot location 765') of the second measurement spot 765 along first and second sensing axis directions of the second position sensitive detector 727.

As illustrated in FIG. 7, the stylus position detection portion 711 includes a first position detection configuration 713 and a second position detection configuration 725. The first position detection configuration 713 includes a first measurement spot generating configuration 750 and a first position sensitive detector 721. The second position detection configuration 725 includes a second measurement spot generating configuration 760 and a second position sensitive detector 727. The first position sensitive detector 721 includes a first photodetector 722, and the second position sensitive detector 727 includes a second photodetector 728. As described above with respect to FIG. 4, in various implementations the first and second photodetectors 722 and 728 may each be quadrant-type photodetectors.

A light source configuration 717 includes a light source 718 with a collimating lens 718'. The first measurement spot generating configuration 750 includes the light source 718 with the collimating lens 718' that provides source light along a first source light path 723, reflecting elements 739A and 739B (e.g., 100% mirrors), an emitter portion 751, a first measurement spot path 723', a first lens 752, a first spatial filter 753 and a first source light filter 754. The second measurement spot generating configuration 760 also includes the light source 718 with the collimating lens 718' that provides source light along a second source light path 729, the reflecting elements 739A and 739B, the emitter portion 751, a second measurement spot path 729', a second lens 762, a second spatial filter 763 and a second source light filter 764.

In operation, source light (e.g., comprising a first wavelength range) is radiated from the light source 718 and is provided along a source light path (i.e., corresponding to both the first source light path 723 and the second source light path 729). The source light is reflected by the reflecting element 739A toward the reflecting element 739B (e.g., a 100% mirror) which further reflects the source light toward the emitter portion 751 that is arranged approximately along the axial direction AD relative to the rotation center RC of the stylus suspension portion 407. In various implementations, the light source 718 with the collimating lens 718' provides the source light in the form of a collimated light beam that is broad enough to allow the reflecting element 739B and correspondingly the emitter portion 751 to remain in the source light over the movement range of the reflecting element 739B (i.e., as corresponding to the movement range of the moving member 412). The emitter material of the emitter portion 751 inputs the source light and responds by outputting excitation light generated within the emitter material (e.g., the generated excitation light comprising a second wavelength range not included in the first wavelength range). A first portion of the generated excitation light travels as first measurement light along the first measurement spot path 723' to form a first measurement spot 755 at the first spot location 755' on the first position sensitive detector 721, and a second portion of the generated excitation light travels as second measurement light along the second measurement spot path 729' to form a second measurement spot 765 at the second spot location 765' on the second position sensitive detector 727.

In various implementations, the imaging first and second lenses 752 and 762 are configured to image the emitter portion 751 onto the photodetectors 722 and 728, respectively. In general, the second lens 762 is configured and located to fulfill the function of imaging the emitter portion 751 onto the second photodetector 728, and the first lens 752 is configured and located to fulfill the function of imaging the emitter portion 751 onto the first photodetector 722. In the illustrated configuration where telecentric arrangements are utilized, the first lens 752 and the second lens 762 are located according to the principle that an object may be at 2f (i.e., at 2× the focus distance) from the lens, and will be imaged in focus 2f behind the lens. The apertures (e.g., the spatial filters 753 and 763) at 1f allow only collimated input rays through to create the images of the emitter portion on the respective photodetectors 722 and 728. In the example of FIG. 7, in one implementation the lengths of the first measurement spot path 723' and the second measurement spot path 729' may be approximately equal. It will be appreciated that in various implementations, different configurations and locations of components may be implemented for various reasons (e.g., practical spacing, economic considerations, etc.)

It will be appreciated that in various implementations telecentric arrangements may result in more constant measurement spot sizes and shapes on the photodetectors 722 and 728 as the emitter portion 751 moves to different distances along the focus axis (i.e., wherein the collimated rays still define the emitter edges). In various implementations, for such movements the emitter edges may otherwise get "fuzzier" or otherwise slightly blurrier, but the nominal spot size and shape may not significantly change. Such configurations may thus reduce cross-coupling effects, which may otherwise influence the measurement spot sizes and shapes on the "cross-coupled" photodetectors (e.g., as axial and/or rotary motion changes the "focusing distance" of the spot paths, etc.) Such movements would alter the measurement spot sizes and shapes more significantly in non-telecentric arrangements. In various implementations, such issues (e.g., varying spot sizes and shapes) may be addressed at least in part with calibration, although in certain implementations it may be desirable to configure the optical components to reduce such issues.

In various implementations, it may be particularly desirable to reduce such issues in configurations such as that illustrated in the example of FIG. 7. More specifically, as noted above, in various implementations the shape of the emitter portion 751 may be made to have a square geometry and the phosphor may be configured to achieve a uniform intensity of the measurement light in the measurement spots 755 and 765 so as to achieve a desired linear response for the movement on the spot locations 755' and 765' on the quadrant-type photodetectors 722 and 728, respectively. In such configurations, it may be desirable to utilize telecentric configurations to reduce issues such as varying spot sizes and shapes, in order to more accurately maintain the desired linear response.

Figure 8:
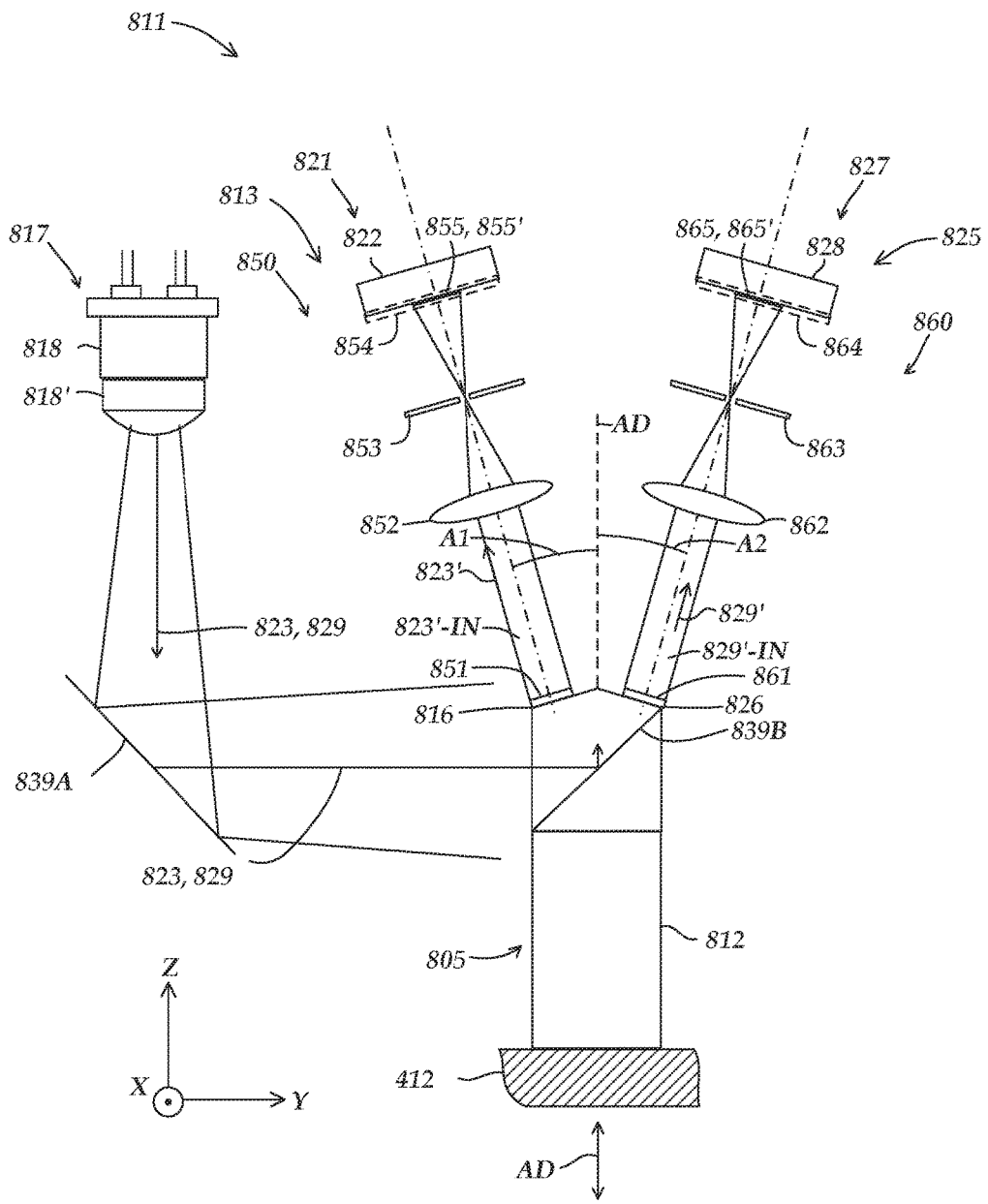
FIG. 8 is a partially schematic diagram showing a fourth exemplary implementation of a stylus position detection portion.

FIG. 8 is a partially schematic diagram showing a fourth exemplary implementation of a stylus position detection portion 811. In the example of FIG. 8, the stylus position detection portion 811 includes a position indicating element 805 which includes an extending portion 812', a reflecting element 839B, position indicating element portions 816 and 826, and emitter portions 851 and 861. The position indicating element portions 816 and 826 are angled surfaces on which the emitter portions 851 and 861 are located, respectively. The emitter portions 851 and 861 are approximately symmetrically arranged on opposite sides of a plane parallel to the axial direction AD and through the rotation center RC of the stylus suspension portion 407. In various implementations, such a configuration may have certain advantages over the configuration of FIG. 7 (e.g., wherein the emitter portions 851 and 861 are more squarely spatially aligned for imaging with respect to measurement spot paths 823' and 829' and the photodetectors 822 and 828, and the greater spatial separation provides greater angles for the trigonometric position determination calculations, etc.)

In various implementations, the extending portion 812' is structured to support and position the reflecting element 839B and the emitter portions 851 and 861 to perform their respective functions, as will be described in more detail below. For example, in one implementation the extending portion 812' may include a transparent glass block assembly in which the reflecting element 839B is located and on top angled surfaces of which the emitter portions 851 and 861 are located. As another example, in an alternative implementation the extending portion 812' may include a frame for supporting the reflecting element 839B and the emitter portions 851 and 861 in their respective positions, with open air sections in between within the frame. The extending portion 812' is attached to the moving member 412.

Certain components of the stylus position detection portion 811 are similar to those of the stylus position detection portion 511 of FIG. 6, and will be understood to operate similarly except as otherwise described below. Certain differences from the implementation of FIG. 6 are similar to those of FIG. 7 and include that in the implementation of FIG. 8 an input portion 823'-IN of the first measurement spot path 823' that inputs the first portion of the generated excitation light forms an angle A1 (e.g., of at least 15 degrees) relative to the axial direction AD. In addition, an input portion 829'-IN of the second measurement spot path 829' that inputs the second portion of the generated excitation light forms an angle A2 (e.g., of at least 15 degrees) relative to the axial direction AD, and forms an angle A1+A2 (e.g., of at least 30 degrees) relative to the input portion 823'-IN of the first measurement spot path 823'. Furthermore, the first and second sensing axis directions of a first position sensitive detector 821 are approximately perpendicular to one another in a plane oriented perpendicular to a direction of the first measurement spot path 823' where it intersects with the first position sensitive detector 821. The first photodetector 822 is configured to provide an output that is responsive to the position (i.e., the spot location 855') of the first measurement spot 855 along first and second sensing axis directions of the first position sensitive detector 821. In addition, the first and second sensing axis directions of a second position sensitive detector 827 are approximately perpendicular to one another in a plane oriented perpendicular to a direction of the second measurement spot path 829' where it intersects with the second position sensitive detector 827. The second photodetector 828 is configured to provide an output that is responsive to the position (i.e., the spot location 865') of the second measurement spot 865 along first and second sensing axis directions of the second position sensitive detector 827.

As illustrated in FIG. 8, the stylus position detection portion 811 includes a first position detection configuration 813 and a second position detection configuration 825. The first position detection configuration 813 includes a first measurement spot generating configuration 850 and the first position sensitive detector 821. The second position detection configuration 825 includes a second measurement spot generating configuration 860 and the second position sensitive detector 827. The first position sensitive detector 821 includes the first photodetector 822 and the second position sensitive detector 827 includes the second photodetector 828. As described above with respect to FIG. 4, in various implementations the first and second photodetectors 822 and 828 may each be quadrant-type photodetectors.

A light source configuration 817 includes a light source 818 with a collimating lens 818'. The first measurement spot generating configuration 850 includes the light source 818 with the collimating lens 818' that provides source light along a first source light path 823, reflecting elements 839A and 839B (e.g., 100% mirrors), the emitter portion 851, a first measurement spot path 823', a first lens 852, a first spatial filter 853 and a first source light filter 854. The second measurement spot generating configuration 860 also includes the light source 818 with the collimating lens 818' that provides source light along a second source light path 829, the reflecting elements 839A and 839B, the emitter portion 861, a second measurement spot path 829', a second lens 862, a second spatial filter 863 and a second source light filter 864.

In operation, source light (e.g., comprising a first wavelength range) is radiated from the light source 818 and is provided along a source light path (i.e., corresponding to both the first source light path 823 and the second source light path 829) and is reflected by the reflecting element 839A toward the reflecting element 839B, which further reflects the source light toward the first emitter portion 851 and the second emitter portion 861. In various implementations, the light source 818 with the collimating lens 818' provides the source light in the form of a light beam that is broad enough to allow the reflecting element 839B and correspondingly the emitter portions 851 and 861 to remain in the source light over the movement range of the reflecting element 839B (i.e., as corresponding to the movement range of the moving member 412). The emitter material of the emitter portions 851 and 861 inputs the source light and responds by outputting excitation light generated within the emitter material (e.g., the generated excitation light comprising a second wavelength range not included in the first wavelength range). A first portion of the generated excitation light (i.e., from the first emitter portion 851) travels as first measurement light along the first measurement spot path 823' to form a first measurement spot 855 at a first spot location 855' on the first position sensitive detector 821. A second portion of the generated excitation light (i.e., from the second emitter portion 861) travels as second measurement light along the second measurement spot path 829' to form a second measurement spot 865 at a second spot location 865' on the second position sensitive detector 827.

In various implementations, the imaging lenses 852 and 862 are configured to image the emitter portions 851 and 861 onto the photodetectors 822 and 828, respectively. In general, the second lens 862 is configured and located to fulfill the function of imaging the emitter portion 861 onto the second photodetector 828, and the first lens 852 is configured and located to fulfill the function of imaging the emitter portion 851 onto the first photodetector 822. In the illustrated configuration in which telecentric arrangements are utilized, the first lens 852 and the second lens 862 are located according to the principle that an object may be at 2f (i.e., at 2x the focus distance) from the lens, and will be imaged in focus 2f behind the lens. The apertures (e.g., the spatial filters 853 and 863) at 1f allow only collimated input rays through to create the images of the emitter portions 851 and 861 on the photodetectors 822 and 828, respectively. In the example of FIG. 8, in one implementation the lengths of the first measurement spot path 823' and the second measurement spot path 829' may be approximately equal. It will be appreciated that in various implementations, different configurations and locations of components may be implemented for various reasons (e.g., practical spacing, economic considerations, etc.)

As described above with respect to FIG. 7, it will be appreciated that in various implementations telecentric arrangements may result in more constant measurement spot sizes and shapes on the photodetectors 822 and 828 as the emitter portions 851 and 861 move to different distances along the focus axes (i.e., wherein the collimated rays still define the emitter edges). As noted above, in various implementations the shape of the emitter portions 851 and 861 may be made to have a square geometry and the phosphor may be configured to achieve a uniform intensity of the measurement light in the measurement spots 855 and 865 so as to achieve a desired linear response for the movement on the spot locations 855' and 865' on the quadrant-type photodetectors 822 and 828, respectively. In such configurations, it may be desirable to utilize telecentric configurations to reduce issues such as varying spot sizes and shapes, in order to more accurately maintain the desired linear response. Such principles will similarly be understood to apply to the other implementations disclosed herein that are similarly illustrated as including telecentric imaging configurations.

Figure 9:
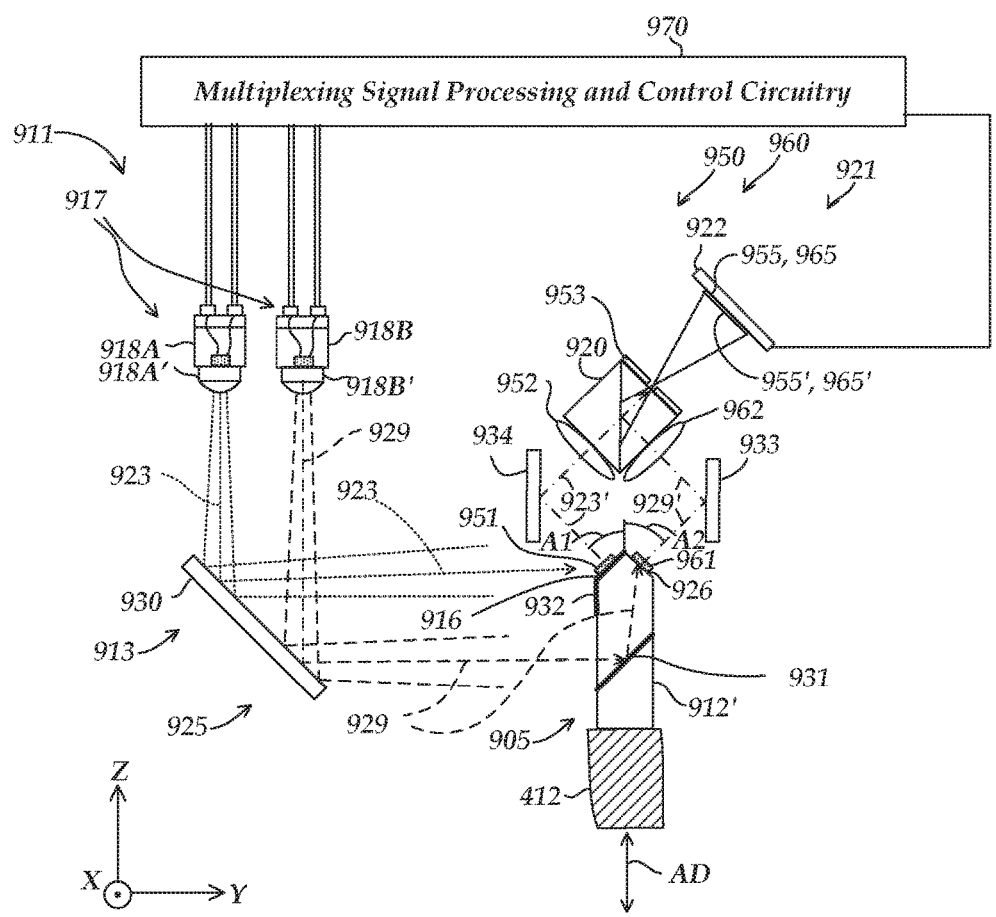
FIG. 9 is a partially schematic diagram showing a fifth exemplary implementation of a stylus position detection portion.

FIG. 9 is a partially schematic diagram showing a fifth exemplary implementation of a stylus position detection portion 911. In the example of FIG. 9, the stylus position detection portion 911 includes a position indicating element 905 which includes an extending portion 912', reflecting elements 931 and 932, position indicating element portions 916 and 926, and emitter portions 951 and 961. The position indicating element portions 916 and 926 are angled surfaces on which the emitter portions 951 and 961 are located, respectively. The emitter portions 951 and 961 are approximately symmetrically arranged on opposite sides of a plane parallel to the axial direction AD and through the rotation center RC of the stylus suspension portion 407.

In various implementations, the extending portion 912' is structured to support and position the reflecting elements 931 and 932 and the emitter portions 951 and 961 to perform their respective functions, as will be described in more detail below. For example, in one implementation the extending portion 912' may include a transparent glass block assembly in which the reflecting element 931 is located and on top angled surfaces of which the reflecting element 932 and the emitter portions 951 and 961 are located. As another example, in an alternative implementation the extending portion 912' may include a frame for supporting the reflecting elements 931 and 932 and the emitter portions 951 and 961 in their respective positions, with open air sections in between within the frame. The extending portion 912' is attached to the moving member 412.

Certain components of the stylus position detection portion 911 are similar to those of the stylus position detection portion 811 of FIG. 8, and will be understood to operate similarly except as otherwise described below. Certain differences from the implementation of FIG. 8 include that multiplexing signal processing and control circuitry 970 is provided (e.g., as part of the scanning probe) and controls a timing of first and second light sources 918A and 918B (i.e., as part of a light source configuration 917) to multiplex first and second measurement spots 955 and 965 onto a position sensitive detector 921. The multiplexing signal processing and control circuitry 970 further provides demultiplexing to separate the output signals (e.g., first and second sets of position indicating signals) from the position sensitive detector 921 corresponding to the spot positions 955' and 965' of the first and second measurement spots 955 and 965 on the position sensitive detector 921.

As illustrated in FIG. 9, the stylus position detection portion 911 includes a first position detection configuration 913 and a second position detection configuration 925. The first position detection configuration 913 includes a first measurement spot generating configuration 950 and the position sensitive detector 921. The second position detection configuration 925 includes a second measurement spot generating configuration 960 and the position sensitive detector 921. As illustrated, the position sensitive detector 921 includes a photodetector 922. As described above with respect to FIG. 4, in various implementations the photodetector 922 may be a quadrant-type photodetector.

The first measurement spot generating configuration 950 includes the first light source 918A with a collimating lens 918A' that provides source light along a first source light path 923, a reflecting element 930, a reflecting element 932, a first emitter portion 951, a first measurement spot path 923', a reflecting element 934, a first lens 952, a beamsplitter 920 and a spatial filter 953. The second measurement spot generating configuration 960 includes the second light source 918B with a collimating lens 918B' that provides source light along a second source light path 929, the reflecting element 930, a reflecting element 931, a second emitter portion 961, a second measurement spot path 929', a reflecting element 933, a second lens 962, the beamsplitter 920, and the spatial filter 953.

In operation, source light (e.g., comprising a first wavelength range) is radiated from the first light source 918A of the light source configuration 917 and is provided along the first source light path 923 and is reflected by the reflecting element 930 to be directed toward the first emitter portion 951. The reflecting element 932 inhibits source light from the second source light path 929 from reaching the first emitter portion 951, and also inhibits source light from the first source light path 923 from reaching the second emitter portion 961, in order to achieve the desired multiplexing of the signals, as will be described in more detail below. The emitter material of the first emitter portion 951 inputs the source light from the first source light path 923 and responds by outputting a first portion of excitation light generated within the emitter material (e.g., the generated excitation light comprising a second wavelength range not included in the first wavelength range). The first portion of generated excitation light travels as first measurement light along the first measurement spot path 923' to form a first measurement spot 955. The first spot location 955' changes in response to a corresponding change in a position of the position indicating element 405 and the stylus coupling portion 442. The position sensitive detector 921 outputs a first set of position indicating signals that are indicative of the first spot location 955' on the first position sensitive detector 921.

In addition, source light (e.g., comprising a first wavelength range) is radiated from the second light source 918B of the light source configuration 917 and is provided along the second source light path 929 and is reflected by the reflecting elements 930 and 931 to travel toward the second emitter portion 961. The emitter material of the second emitter portion 961 inputs the source light and responds by outputting a second portion of excitation light (e.g., the generated excitation light comprising a second wavelength range not included in the first wavelength range). The second portion of generated excitation light travels as second measurement light along the second measurement spot path 929' to form a second measurement spot 965. The second spot location 965' changes in response to a corresponding change in a position of the position indicating element 405 and the stylus coupling portion 442. The position sensitive detector 921 outputs a second set of position indicating signals that are indicative of the second spot location 965' on the first position sensitive detector 921.

The multiplexing signal processing and control circuitry 970 receives the multiplexed first and second sets of position indicating signals from the position sensitive detector 921. The multiplexing signal processing and control circuitry 970 performs demultiplexing operations to separate the first set of position indicating signals from the second set of position indicating signals. Operations of such multiplexing signal processing and control circuitry are described in more detail in copending and commonly assigned U.S. patent application Ser. No. 14/973,376, entitled "Measurement Device With Multiplexed Position Signals", filed on Dec. 17, 2015, which is hereby incorporated herein by reference in its entirety.

In various implementations, an input portion of the first measurement spot path 923' that inputs the first portion of the generated excitation light forms an angle A1 (e.g., of approximately 45 degrees) relative to the axial direction AD. In addition, an input portion of the second measurement spot path 929' that inputs the second portion of the generated excitation light forms an angle A2 (e.g., of approximately 45 degrees) relative to the axial direction AD, and forms an angle A1+A2 (e.g., of approximately 90 degrees) relative to the input portion of the first measurement spot path 923'.

In various implementations, the reflecting elements 931, 932, 933 and 934 are 100% reflecting mirrors. For at least the reflecting element 932, both sides may be 100% reflective. In various implementations, the reflecting elements 931 and 932 may comprise mirrored prism surfaces (e.g., on a transparent glass block assembly of the extending portion 912'), or they may be individual mirrors assembled on a frame of the extending portion 912' for which the optical path may be directed through air. In various implementations, the reflecting elements 931 and 932 and the first and second emitter portions 951 and 961 are part of the position indicating element 905 which is coupled to the moving member 412, while the remaining elements of the stylus position detection portion 911 may be coupled to the main body frame of the scanning probe.

In various implementations, the beamsplitter 920 may comprise a 50% reflecting mirror. Alternatively, the emitter material may comprise narrow band phosphors or may produce different wavelength outputs, and the beamsplitter 920 may comprise a dichroic filter/reflector that transmits all of the wavelength range of the first emitter portion 951 (i.e., as received from the reflecting element 934) and reflects all of the wavelength range from the second emitter portion 961 (i.e., as received from the reflecting element 933). In various implementations, as described above with respect to FIG. 4, the position sensitive detector 921 may be a two-dimensional detector wherein the photodetector 922 may be a quadrant-type photodetector. In various implementations, the light sources 918A and 918B may be alternately activated as controlled by the multiplexing signal processing and control circuitry 970. In various alternative implementations, the light sources 918A and 9186 may be continuously modulated and the position sensitive detector 921 may be continuously demodulated at the same time, but at respective frequencies such that the detector signals can be separated by filtering/demodulating circuits in the multiplexing signal processing and control circuitry 970.

As described above with respect to FIG. 7, it will be appreciated that in various implementations telecentric arrangements (e.g., including the lenses 952 and 962 and the spatial filter 953) may result in more constant measurement spot sizes and shapes on the photodetector 922 as the emitter portions 951 and 961 move to different distances along the focus axes (i.e., wherein the collimated rays still define the emitter edges). As noted above, in various implementations the shape of the emitter portions 951 and 961 may be made to have a square geometry and the phosphor may be configured to achieve a uniform intensity of the measurement light in the measurement spots 955 and 965 so as to achieve a desired linear response for the movement on the spot locations 955' and 965' on the quadrant-type photodetector 922. In such configurations, it may be desirable to utilize telecentric configurations to reduce issues such as varying spot sizes and shapes, in order to more accurately maintain the desired linear response.

It will be appreciated that the variations shown in FIGS. 3-9 are indicative of the possibility of further rearranging and/or adjusting various optical elements and related optical paths while retaining many or all of the advantages outlined in association with the principles disclosed herein. For example, in various implementations, an emitter portion with the emitter material (e.g., phosphor) may be implemented as part of a miniature assembly that produces a less diffuse/more concentrated beam, such as described in U.S. Patent Publication Nos. 2013/0222772 and 2017/0017091, each of which is hereby incorporated herein by reference in its entirety. In general, it will be understood that the various implementations disclosed herein are intended to be exemplary only and not limiting.

In various implementations, the configurations illustrated in FIGS. 3-9 may provide various advantages. For example, the emitter material (e.g., phosphor) utilized in the emitter portions may be a passive element such that environmental position drift may be reduced (e.g., as compared to other potential light sources such as an LED point source which may experience turn on drift, etc.) In configurations where most or all of the collection optics are fixed (e.g., attached to the frame), any cross coupling that might otherwise occur due to moving optics (e.g., wherein purely rotary movement such as in θY may be undesirably detected as axial movement according to movement of the second measurement spot on the second position sensitive detector or vice versa) may be reduced or eliminated.

Figure 10:
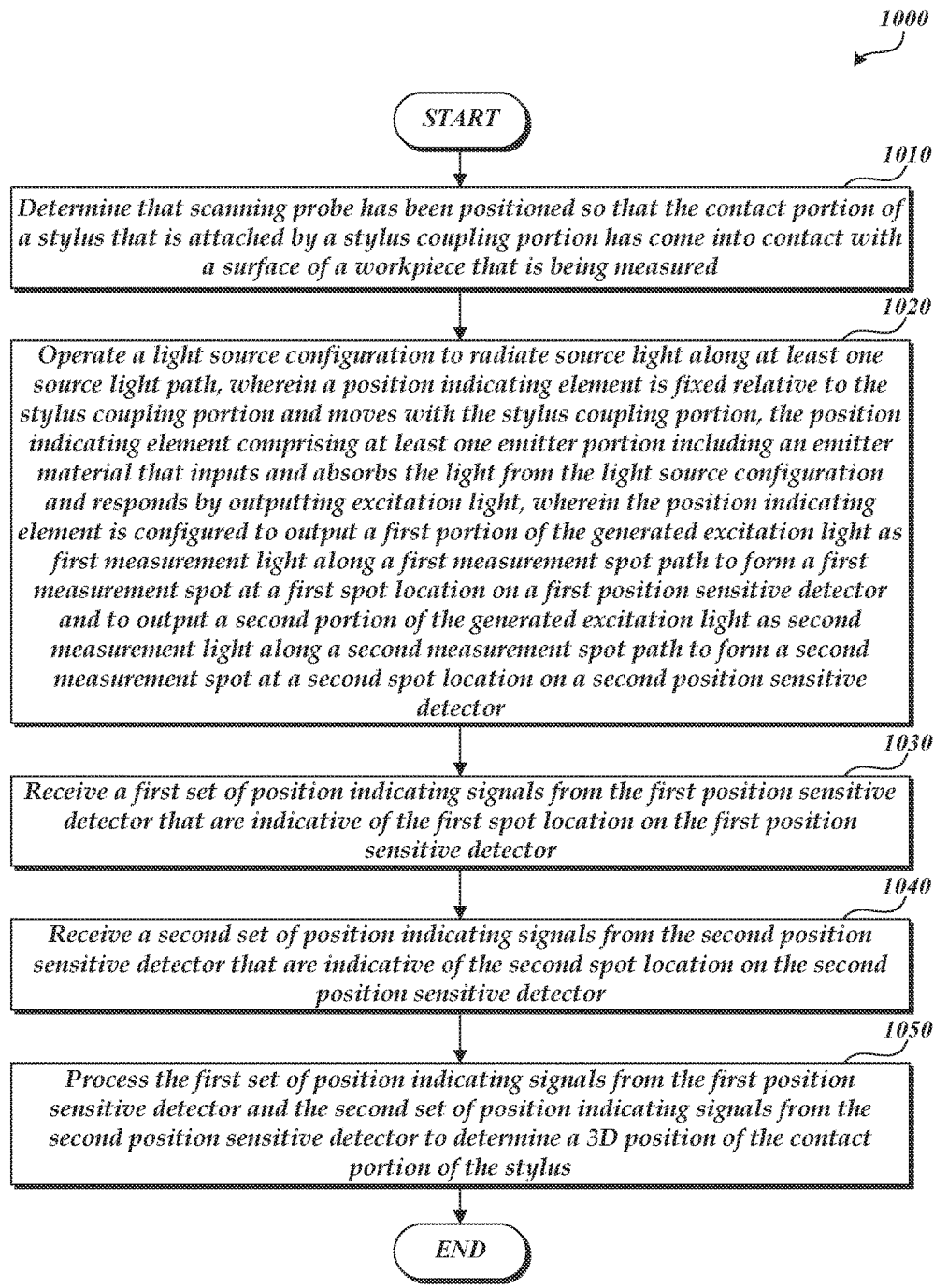
FIG. 10 is a flow diagram illustrating one exemplary implementation of a routine for determining a 3D position of a contact portion of a stylus based on position signals received from a scanning probe.

FIG. 10 is a flow diagram illustrating one exemplary implementation of a routine 1000 for determining a 3D position of a contact portion of a stylus based on position signals received from a scanning probe. At a block 1010, a determination is made that the scanning probe has been positioned so that the contact portion of a stylus that is attached by a stylus coupling portion has come into contact with a surface of a workpiece that is being measured. At a block 1020, a light source configuration is operated to radiate source light along at least one source light path. A position indicating element is fixed relative to the stylus coupling portion and moves with the stylus coupling portion, and comprises at least one emitter portion including an emitter material that inputs and absorbs the light from the light source configuration and responds by outputting excitation light. The position indicating element is configured to output a first portion of the generated excitation light as first measurement light along a first measurement spot path to form a first measurement spot at a first spot location on a first position sensitive detector and to output a second portion of the generated excitation light as second measurement light along a second measurement spot path to form a second measurement spot at a second spot location on a second position sensitive detector.

At a block 1030, a first set of position indicating signals are received from the first position sensitive detector that are indicative of the first spot location on the first position sensitive detector. At a block 1040, a second set of position indicating signals are received from the second position sensitive detector that are indicative of the second spot location on the second position sensitive detector. At a block 1050, the first set of position indicating signals from the first position sensitive detector and the second set of position indicating signals from the second position sensitive detector are processed to determine a 3D position of the contact portion of the stylus (e.g., as corresponding to a measured surface point on a workpiece surface that the contact portion is in contact with, etc.)

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

What is claimed is:

1. A scanning probe for a coordinate measuring machine, the scanning probe comprising:
a frame;
a stylus suspension portion that is attached to the frame, comprising:
a stylus coupling portion that is configured to be rigidly coupled to a stylus; and
a stylus motion mechanism that is configured to enable axial motion of the stylus coupling portion along an axial direction, and rotary motion of the stylus coupling portion about a rotation center; and
a stylus position detection portion, comprising:
a first position sensitive detector which is fixed relative to the frame and which comprises a first photodetector configured to provide an output that is responsive to the position of a first measurement spot along first and second sensing axis directions of the first position sensitive detector;
a light source configuration that is fixed relative to the frame and configured to radiate source light comprising a first wavelength range along at least one source light path; and
a position indicating element that is fixed relative to the stylus coupling portion and moves with the stylus coupling portion, the position indicating element comprising at least one emitter portion including an emitter material that inputs the light in the first wavelength range from the light source and responds by outputting excitation light generated within the emitter material, the generated excitation light comprising a second wavelength range not included in the first wavelength range, wherein:
the at least one emitter portion is configured to input the source light along the at least one source light path regardless of the position of the stylus coupling portion within its motion range;
the position indicating element is configured to output a first portion of the generated excitation light as first measurement light along a first measurement spot path to form the first measurement spot at a first spot location on the first position sensitive detector, for which the first spot location changes in response to a corresponding change in a position of the position indicating element and the stylus coupling portion; and
the first position sensitive detector outputs a first set of position indicating signals that are indicative of the first spot location on the first position sensitive detector.

2. The scanning probe of claim 1, further comprising a second position sensitive detector which is fixed relative to the frame and which comprises a second photodetector configured to provide an output that is responsive to the position of a second measurement spot along at least a first sensing axis direction of the second position sensitive detector, wherein:
the position indicating element is further configured to output a second portion of the generated excitation light as second measurement light along a second measurement spot path to form the second measurement spot at a second spot location on the second position sensitive detector, for which the second spot location changes in response to a corresponding change in a position of the position indicating element and the stylus coupling portion; and
the second position sensitive detector outputs a second set of position indicating signals that are indicative of the second spot location on the second position sensitive detector.

3. The scanning probe of claim 2, wherein the first set of position indicating signals in combination with the second set of position indicating signals are indicative of the position of the position indicating element and the stylus coupling portion relative to the frame.

4. The scanning probe of claim 2, wherein:
the first sensing axis direction of the second position sensitive detector is approximately parallel to the axial direction; and
the first and second sensing axis directions of the first position sensitive detector are approximately perpendicular to one another in a plane oriented transverse to the axial direction.

5. The scanning probe of claim 2, wherein the at least one emitter portion comprises:
a first emitter portion configured to output the first portion of the generated excitation light as the first measurement light along the first measurement spot path; and
a second emitter portion configured to output the second portion of the generated excitation light as the second measurement light along the second measurement spot path.

6. The scanning probe of claim 2, wherein:
the output of the second photodetector is further responsive to the position of the second measurement spot along a second sensing axis direction of the second position sensitive detector;
an input portion of the first measurement spot path that inputs the first portion of the generated excitation light forms an angle of at least 15 degrees relative to the axial direction;
an input portion of the second measurement spot path that inputs the second portion of the generated excitation light forms an angle of at least 15 degrees relative to the axial direction, and forms an angle of at least 30 degrees relative to the input portion of the first measurement spot path.

7. The scanning probe of claim 6, wherein:
the first and second sensing axis directions of the first position sensitive detector are approximately perpendicular to one another in a plane oriented perpendicular to a direction of the first measurement spot path; and
the first and second sensing axis directions of the second position sensitive detector are approximately perpendicular to one another in a plane oriented perpendicular to a direction of the second measurement spot path.

8. The scanning probe of claim 2, wherein the position indicating element is located approximately along the axial direction relative to the rotation center, and the at least one emitter portion comprises one of:
a) a first emitter portion only, that receives the source light and emits both the first and second portions of the generated excitation light, and is arranged approximately along the axial direction relative to the rotation center;
b) a first emitter portion that receives the source light and emits the first portion of the generated excitation light, and a second emitter portion that receives the source light and emits a second portion of the generated excitation light, wherein the first and second emitter portions are approximately symmetrically arranged on opposite sides of a plane parallel to the axial direction and through the rotation center; or c) first and second emitter portions, wherein the position indicating element further comprises a beamsplitter element that receives and divides the source light, and the first emitter portion is located on the beamsplitter element to receive a first portion of the divided source light and emit the first portion of the generated excitation light, and the second emitter portion is located on the beamsplitter element to receive a second portion of the divided source light and emit the second portion of the generated excitation light.

9. The scanning probe of claim 1, wherein the first photodetector is a quadrant-type photodetector.

10. The scanning probe of claim 9, wherein:
the at least one emitter portion comprises a first emitter portion that is configured to appear in an approximately square shape when viewed along the first measurement spot path; and
the first measurement spot path passes through a first optical configuration that images the first emitter portion onto the first photodetector.

11. The scanning probe of claim 10, wherein the first optical configuration comprises a telecentric imaging configuration.

12. The scanning probe of claim 11, wherein the telecentric imaging configuration comprises:
a first lens configured to input the first measurement light and to focus the first measurement light to form the first measurement spot on the first position sensitive detector; and
a first spatial filter with an aperture located between the first lens and the first position sensitive detector, wherein the first spatial filter is configured to spatially filter the first measurement light from the first lens.

13. The scanning probe of claim 1, wherein the stylus position detection portion further comprises a first optical filter that is located in the first measurement spot path and that is configured to block the source light in the first wavelength range from reaching the first position sensitive detector and to allow the first measurement light in the second wavelength range to pass through to reach the first position sensitive detector.

14. The scanning probe of claim 1, wherein the emitter material of the at least one emitter portion comprises at least one of phosphor material, photoluminescent semiconductor nanoparticles, nanocrystals, quantum dots, or nanorods.

15. The scanning probe of claim 1, wherein:
the light source configuration comprises first and second light sources;
the at least one source light path comprises first and second source light paths;
the first light source is configured to radiate the source light comprising the first wavelength range along the first source light path;
the second light source is configured to radiate source light comprising the first wavelength range along a second source light path;
in response to the source light from the second source light path, the position indicating element is further configured to output a second portion of the generated excitation light as second measurement light along a second measurement spot path to form a second measurement spot at a second spot location on the first position sensitive detector, for which the second spot location changes in response to a corresponding change in a position of the position indicating element and the stylus coupling portion; and
the scanning probe further comprises multiplexing signal processing and control circuitry that is configured to control a timing of the first and second light sources to multiplex the first and second measurement spots onto the first position sensitive detector, and to provide demultiplexing to separate the output signals from the first position sensitive detector corresponding to the first and second measurement spots.

16. A system for determining a 3D position of a contact portion of a stylus based on position signals received from a scanning probe that the stylus is coupled to, the system comprising:
a scanning probe comprising:
a frame;
a stylus suspension portion that is attached to the frame, comprising:
a stylus coupling portion that is rigidly coupled to a stylus with a contact portion; and
a stylus motion mechanism that is configured to enable axial motion of the stylus coupling portion along an axial direction, and rotary motion of the stylus coupling portion about a rotation center; and
a stylus position detection portion, comprising:
a first position sensitive detector which is fixed relative to the frame and which comprises a first photodetector configured to provide an output that is responsive to the position of a first measurement spot along first and second sensing axis directions of the first position sensitive detector;
a second position sensitive detector which is fixed relative to the frame and which comprises a second photodetector configured to provide an output that is responsive to the position of a second measurement spot along at least a first sensing axis direction of the second position sensitive detector;
a light source configuration that is fixed relative to the frame and configured to radiate source light comprising a first wavelength range along at least one source light path;
a position indicating element that is fixed relative to the stylus coupling portion and moves with the stylus coupling portion, the position indicating element comprising at least one emitter portion including an emitter material that is configured to input the light in the first wavelength range from the light source and respond by outputting excitation light generated within the emitter material, the generated excitation light comprising a second wavelength range not included in the first wavelength range; and
a processing portion;
wherein:
the at least one emitter portion is configured to input the source light along the at least one source light path regardless of the position of the stylus coupling portion within its motion range;
the position indicating element is configured to output:
a first portion of the generated excitation light as first measurement light along a first measurement spot path to form the first measurement spot at a first spot location on the first position sensitive detector, for which the first spot location changes in response to a corresponding change in a position of the position indicating element and the stylus coupling portion; and a second portion of the generated excitation light as second measurement light along a second measurement spot path to form the second measurement spot at a second spot location on the second position sensitive detector, for which the second spot location changes in response to a corresponding change in a position of the position indicating element and the stylus coupling portion;

the first position sensitive detector is configured to output a first set of position indicating signals that are indicative of the first spot location on the first position sensitive detector;

the second position sensitive detector is configured to output a second set of position indicating signals that are indicative of the second spot location on the second position sensitive detector; and the processing portion is configured to process the first set of position indicating signals from the first position sensitive detector and the second set of position indicating signals from the second position sensitive detector to determine a 3D position of the contact portion of the stylus.

17. The system of claim 16, wherein the first photodetector is a quadrant-type photodetector.

18. The system of claim 17, wherein:
the at least one emitter portion comprises a first emitter portion that is configured to appear in an approximately square shape when viewed along the first measurement spot path; and
the first measurement spot path passes through a first optical configuration that images the first emitter portion onto the first photodetector.

19. The system of claim 18, wherein the first optical configuration comprises a telecentric imaging configuration.

20. A method for determining a 3D position of a contact portion of a stylus based on position signals received from a scanning probe that the stylus is coupled to, the method comprising:
determining that the scanning probe has been positioned so that the contact portion of the stylus has come into contact with a workpiece that is to be measured, wherein the scanning probe comprises:
a frame;
a stylus suspension portion that is attached to the frame, comprising:
a stylus coupling portion that is rigidly coupled to a stylus with a contact portion; and
a stylus motion mechanism that is configured to enable axial motion of the stylus coupling portion along an axial direction, and rotary motion of the stylus coupling portion about a rotation center; and
a stylus position detection portion, comprising:
a first position sensitive detector which is fixed relative to the frame and which comprises a first photodetector configured to provide an output that is responsive to the position of a first measurement spot along first and second sensing axis directions of the first position sensitive detector;

a second position sensitive detector which is fixed relative to the frame and which comprises a second photodetector configured to provide an output that is responsive to the position of a second measurement spot along at least a first sensing axis direction of the second position sensitive detector;

a light source configuration that is fixed relative to the frame and configured to radiate source light comprising a first wavelength range along at least one source light path;

a position indicating element that is fixed relative to the stylus coupling portion and moves with the stylus coupling portion, the position indicating element comprising at least one emitter portion including an emitter material that inputs the light in the first wavelength range from the light source and responds by outputting excitation light generated within the emitter material, the generated excitation light comprising a second wavelength range not included in the first wavelength range; and wherein:
the at least one emitter portion is configured to input the source light along the at least one source light path regardless of the position of the stylus coupling portion within its motion range;
the position indicating element is configured to output:
a first portion of the generated excitation light as first measurement light along a first measurement spot path to form the first measurement spot at a first spot location on the first position sensitive detector, for which the first spot location changes in response to a corresponding change in a position of the position indicating element and the stylus coupling portion; and
a second portion of the generated excitation light as second measurement light along a second measurement spot path to form the second measurement spot at a second spot location on the second position sensitive detector, for which the second spot location changes in response to a corresponding change in a position of the position indicating element and the stylus coupling portion;
the first position sensitive detector outputs a first set of position indicating signals that are indicative of the first spot location on the first position sensitive detector; and
the second position sensitive detector outputs a second set of position indicating signals that are indicative of the second spot location on the second position sensitive detector;
receiving the first set of position indicating signals from the first position sensitive detector and the second set of position indicating signals from the second position sensitive detector; and
processing the first set of position indicating signals and the second set of position indicating signals to determine a 3D position of the contact portion of the stylus.

* * * * *